US008070959B2

(12) United States Patent
Kanatzidis et al.

(10) Patent No.: US 8,070,959 B2
(45) Date of Patent: Dec. 6, 2011

(54) CHALCOGENIDE COMPOUNDS WITH A CLAY-LIKE CATION-EXCHANGE CAPACITY AND METHODS OF USE

(75) Inventors: Mercouri Kanatzidis, Wilmette, IL (US); Emmanouil Manos, Evanston, IL (US); Nan Ding, Lexington, SC (US)

(73) Assignee: Northwestern University, Evanston, IL (US)

( * ) Notice: Subject to any disclaimer, the term of this patent is extended or adjusted under 35 U.S.C. 154(b) by 476 days.

(21) Appl. No.: 12/285,493

(22) Filed: Oct. 7, 2008

(65) Prior Publication Data
US 2009/0095684 A1 Apr. 16, 2009

Related U.S. Application Data

(60) Provisional application No. 60/978,890, filed on Oct. 7, 2007.

(51) Int. Cl.
*C02F 1/42* (2006.01)
(52) U.S. Cl. .............. 210/688; 436/73; 436/79; 436/84; 252/582; 252/583; 252/584; 252/585; 252/586
(58) Field of Classification Search ........................ None
See application file for complete search history.

(56) References Cited

U.S. PATENT DOCUMENTS

| | | | |
|---|---|---|---|
| 4,040,917 A | 8/1977 | Whittingham | |
| 4,159,962 A | 7/1979 | Di Salvo et al. | |
| 5,531,936 A | 7/1996 | Kanatzidis et al. | |

OTHER PUBLICATIONS

Manos et al., Layered metal sulfides: Exceptionally selective agents for radioactive strontium removal, PNAS, Mar. 11, 2008, pp. 3696-3699, vol. 105, No. 10.
Ding et al., Permeable layers with large windows in $[(CH_3CH_2CH_2)_2NH_2]_5In_5Sb_6S_{19} \cdot 1.45H_2O$: High ion-exchange capacity, size discrimination, and selectivity for Cs ions, Chem Mater, Jul. 17, 2007, pp. 3867-3869, vol. 19.
Divigalpitiya et al., Inclusion systems of organic molecules in restacked single-layer molybdenum disulfide, Science, Oct. 20, 1989, pp. 369-371, vol. 246.
Clement et al., Organometallic intercalates of the layered transition-metal dichalcogenides $TaS_2$ and $ZrS_2$, Inorg Chem, 1978, pp. 2754-2758, vol. 17, No. 10, American Chemical Society.

(Continued)

*Primary Examiner* — Yelena G Gakh
*Assistant Examiner* — David Weisz
(74) *Attorney, Agent, or Firm* — Bell & Manning, LLC

(57) ABSTRACT

Chalcogenide compounds with cation exchange capability and methods of using the compounds are described. Compounds of the general formula $A_{2x}M_xSn_{3-x}S_6$ are described wherein x is 0.1-0.95, A is $Li^+$, $Na^+$, $K^+$ or $Rb^+$ and M is $Mn^{2+}$, $Mg^{2+}$, $Zn^{2+}$, $Fe^{2+}$, $Co^{2+}$ or $Ni^{2+}$. Compounds of the general formula $H_{2x}M_xSn_{3-x}S_6$ are also described wherein x is 0.1-0.95 and $M=Mn^{2+}$, $Mg^{2+}$, $Zn^{2+}$, $Fe^{2+}$, $Co^{2+}$ or $Ni^{2+}$. The compounds can be layered compounds. The compounds are capable of intercalation of $Cs^+$, $Sr^{2+}$, $Hg^{2+}$, $Pb^{2+}$, $Cd^{2+}$, and/or $Ag^+$ ions. A process involving contacting the compounds with a solution comprising one or more ions including $Cs^+$, $Sr^{2+}$, $Hg^{2+}$, $Pb^{2+}$, $Cd^{2+}$, and/or $Ag^+$ is also provided. The one or more ions can be removed from the solution by the compounds. A process comprising contacting compounds of the general formula $A_{2x}M_xSn_{3-x}S_6$ with a solution containing $UO_2^{2+}$, $Th^{4+}$ or $Pu^{4+}$ ions is also described.

19 Claims, 12 Drawing Sheets

OTHER PUBLICATIONS

Heising et al., Exfoliated and restacked $MoS_2$ and $WS_2$: Ionic or neutral species? Encapsulation and ordering of hard electropositive cations., J Am Chem Soc, Dec. 4, 1999, pp. 11720-11732, vol. 121.

Dungey et al., Structural characterization and thermal stability of $MoS_2$ intercalation compounds, Chem Mater, Jul. 11, 1998, pp. 2152-2161, vol. 10.

Bortun et al., Evaluation of Synthetic Inorganic Ion Exchangers for Cesium and Strontium Removal from Contaminated Groundwater and Wastewater, Solvent Extr. Ion Exch., 1997, pp. 909, vol. 15, No. 5.

Sylvester et al., The Removal of Strontium and Cesium from simulated Hanford Groundwater Using Inorgainc Ion Exchange Materials, Solvent Extr. Ion Exch., 1998, pp. 1527, vol. 16, No. 6.

Bortun et al., Synthesis, Characterization, and Ion Exchange Behavior of a Framework Potassium Titanium Trisilicate $K_2TiSi_3O_9 \cdot H_2O$ and Its Protonated Phases, Chem. Mater., Jan. 13, 2000, pp. 294, vol. 12, No. 2.

Möller et al., Update of $^{85}Sr$, $^{134}Cs$ and $^{57}Co$ by antimony silicates doped with $Ti^{4+}$, $Nb^{5+}$, $Mo^{6+}$ and $W^{6+}$, J. Mater. Chem., 2001, pp. 1526, vol. 11.

Mercier et al., Access in Mesoporous Materials: Advantages of a Uniform Pore Structure in the Design of a Heavy Metal Ion Adsorbent for Environmental Remediation, Adv. Mater., 1997, pp. 500, vol. 9, No. 6.

Feng et al., Functionalized Monolayers on Ordered Mesoporous Supports, Science, May 9, 1997, pp. 923, vol. 276.

Gash et al., Efficient Recovery of Elemental Mercury from Hg(II)-Contaminated Aqueous Media Using a Redox-Recyclable Ion-Exchange Material, Environ. Sci. Technol., 1998, pp. 1007, vol. 32, No. 7.

The International Search Report and The Written Opinion for PCT/US08/11550 filed on Oct. 7, 2008, mailed on Dec. 12, 2008.

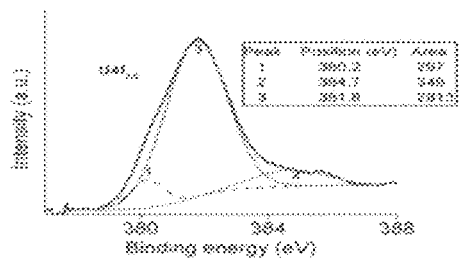
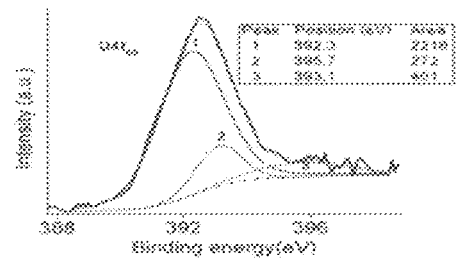
FIG. 16A
FIG. 16B
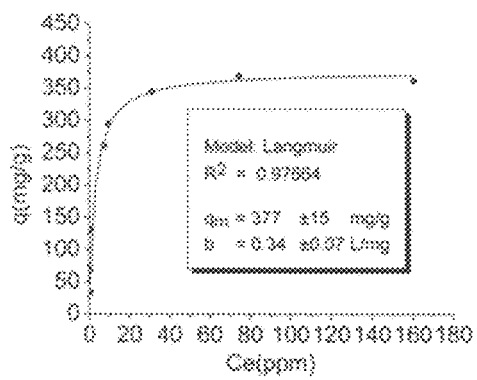
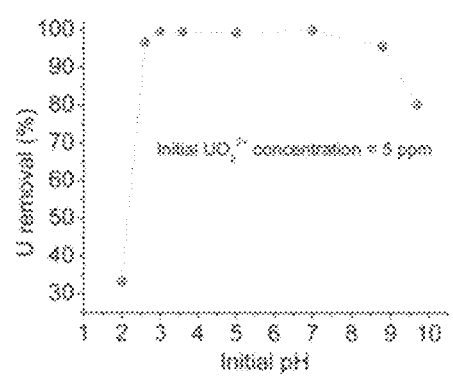
FIG. 17A
FIG. 17B

CHALCOGENIDE COMPOUNDS WITH A CLAY-LIKE CATION-EXCHANGE CAPACITY AND METHODS OF USE

This application claims the benefit of Provisional U.S. Patent Application Ser. No. 60/978,890, filed on Oct. 10, 2007, which is incorporated by reference herein in its entirety.

STATEMENT REGARDING FEDERALLY SPONSORED RESEARCH OR DEVELOPMENT

This invention was made with government support under Grant Nos. DMR-0443785 and DMR-0801855 awarded by the National Science Foundation. The government has certain rights in the invention.

FIELD OF THE INVENTION

The present invention relates generally to chalcogenide compounds and to methods of using the compounds.

BACKGROUND

Clays, zeolites and titanosilicates are used as inorganic ion exchange materials. These materials are excellent adsorbents for cesium and strontium, but they display low selectivity and binding affinity for mercury.

Layered chalcogenides with ion exchange properties remain scarce. The materials that are known are mainly limited to alkali ion-intercalated transition metal dichalcogenides $A_xMQ_2$ (A=alkali ion; M=early transition metal, Q=S, Se, Te). However, such materials are not suitable for practical applications as ion exchangers, due to their thermodynamic and hydrolytic instability.

Accordingly, there still exists a need for improved ion exchange materials.

SUMMARY

According to a first embodiment, a compound of the general formula $A_{2x}M_xSn_{3-x}S_6$ is provided wherein x is 0.1-0.95, A is selected from the group consisting of $Li^+$, $Na^+$, $K^+$, and $Rb^+$ and M is selected from the group consisting of $Mn^{2+}$, $Mg^{2+}$, $Zn^{2+}$, $Fe^{2+}$, $Co^{2+}$ and $Ni^{2+}$.

According to a second embodiment, a process is provided which comprises contacting a compound as set forth above with a solution comprising one or more ions selected from the group consisting of $Cs^+$, $Sr^+$, $Hg^{2+}$, $Pb^{2+}$, $Cd^{2+}$, $Ag^+$ and combinations thereof.

According to a third embodiment, a process is provided which comprises contacting a composition as set forth above with a solution comprising one or more ions selected from the group consisting of $UO_2^{2+}$, $Th^{4+}$, $Pu^{4+}$ and combinations thereof.

According to a third embodiment, a compound of the general formula $H_{2x}M_xSn_{3-x}S_6$ is provided wherein x is 0.1-0.95 and M is selected from the group consisting of $Mn^{2+}$, $Mg^{2+}$, $Zn^{2+}$, $Fe^{2+}$, $Co^{2+}$ and $Ni^{2+}$.

These and other features of the present teachings are set forth herein.

BRIEF DESCRIPTION OF THE DRAWINGS

The drawings described below are for illustration purposes only. The drawings are not intended to limit the scope of the present teachings in any way. The patent or application file contains at least one drawing executed in color. Copies of this patent or patent application publication with color drawing(s) will be provided by the Office upon request and payment of the necessary fee.

FIGS. 16A and 16B are $U4f_{7/2}$ (FIG. 16A) and $U4f_{5/2}$ (FIG. 16B) spectra with the deconvolution of the corresponding peaks into three components.

FIGS. 17A and 17B are equilibrium data for uranyl-absorption by KMS-1 (pH~3-4, V:m=1000 mL/g, contact time 12 h) wherein the red line indicates the fitting of the data with the Langmuir model (FIG. 17A) and a graph showing the percentage of uranium removal versus the initial pH of the solutions (V:m=1000 mL/g, contact time 12 h) (FIG. 17B).

DETAILED DESCRIPTION

Figure 1A:
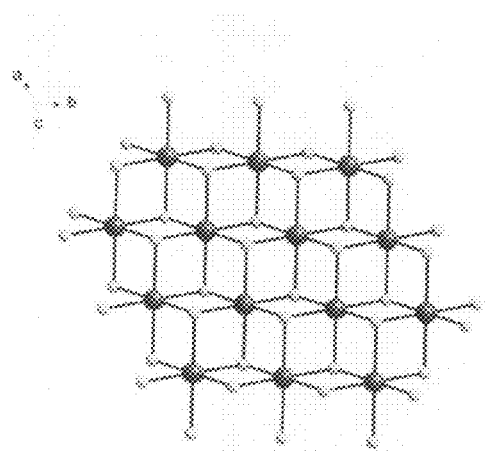
FIG. 1A is a schematic showing part of the layer framework of $K_{1.9}Mn_{0.95}Sn_{2.05}S_6$ viewed down the c-axis wherein the Mn—Sn and S atoms are represented by green and yellow balls respectively.

For the purposes of this disclosure and unless otherwise specified, "a" or "an" means "one or more."

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

Layered chalcogenide materials of the general formula $A_{2x}M_xSn_{3-x}S_6$ (x=0.1-0.95; A=$Li^+$, $Na^+$, $K^+$, $Rb^+$; M=$Mn^{2+}$, $Mg^{2+}$, $Zn^{2+}$, $Fe^{2+}$, $Co^{2+}$ or $Ni^{2+}$) are provided. These materials made of inexpensive, non-toxic elements, can be prepared on a multi-gram scale with solid state or hydrothermal synthesis and are remarkably air, water, and thermally stable. The layered chalcogenide materials described herein exhibit clay-like cation-exchange capacity. The layered chalcogenide materials described herein also exhibit facile and highly selective ion-exchange properties for cations of great environmental concern such as $Cs^+$ and $Sr^{2+}$, the radioactive isotopes of which are the major contaminants in the fission product of nuclear wastes. The layered chalcogenide materials described herein are also extremely capable to clean the water from soft heavy metal ions (e.g. $Hg^{2+}$, $Pb^{2+}$, $Cd^{2+}$, $Ag^+$), which constitute a serious health threat for humans and other species. In addition, solid chalcogenic acids $H_{2x}M_xSn_{3-x}S_6$ (M=$Mn^{2+}$, $Mg^{2+}$, $Zn^{2+}$, $Fe^{2+}$, $Co^{2+}$ or $Ni^{2+}$; x=0.1-0.95), such as $H_{0.4}M_{0.2}Sn_{2.8}S_6$, are described, which are effective for the remediation of $Hg^{2+}$ and $Ag^+$ as well as exhibiting selectivity for these ions over $Cd^{2+}$ and $Pb^{2+}$.

According to some embodiments, A is $K^+$. According to some embodiments, A is $K^+$ and x=0.5-0.95. Compounds of the following general formulae are provided:

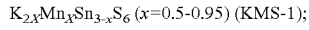

$K_{2x}Mn_xSn_{3-x}S_6$ (x=0.5-0.95) (KMS-1);

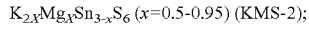

$K_{2x}Mg_xSn_{3-x}S_6$ (x=0.5-0.95) (KMS-2);

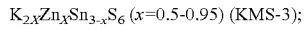

$K_{2x}Zn_xSn_{3-x}S_6$ (x=0.5-0.95) (KMS-3);

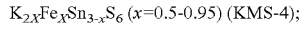

$K_{2x}Fe_xSn_{3-x}S_6$ (x=0.5-0.95) (KMS-4);

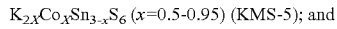

$K_{2x}Co_xSn_{3-x}S_6$ (x=0.5-0.95) (KMS-5); and

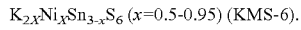

$K_{2x}Ni_xSn_{3-x}S_6$ (x=0.5-0.95) (KMS-6).

Clays and zeolites are characteristic examples of inorganic ion exchange materials. Metal chalcogenides with layered structures and loosely bound interlayer cations could also exhibit similar properties to oxides but with unique attributes.

The presence of the soft chalcogen ligands can induce innate selectivity for soft (or relatively soft) metal ions such as $Cs^+$, $Sr^{2+}$, or heavy metal ions such as $Hg^{2+}$, $Pb^{2+}$, $Cd^{2+}$, and $Ag^+$, and against hard ions such as $Na^+$ or $Ca^{2+}$, a property which could be particularly useful for ion discriminations in nuclear wastes or wastewater with heavy metal ion contaminants.

Layered chalcogenides with ion exchange properties remain scarce. The materials that are known are mainly limited to alkali ion-intercalated transition metal dichalcogenides $A_xMQ_2$ (A=alkali ion; M=early transition metal, Q=S, Se, Te). However, such materials are not suitable for practical applications as ion exchangers, due to their thermodynamic and hydrolytic instability.

Compounds of the formula $A_{2x}M_xSn_{3-x}S_6$ (x=0.1-0.95; A=$Li^+$, $Na^+$, $K^+$ or $Rb^+$; M=$Mn^{2+}$, $Mg^{2+}$, $Zn^{2+}$, $Fe^{2+}$, $Co^{2+}$ or $Ni^{2+}$) and compounds of the formula $H_{2x}M_xSn_{3-x}S_6$ (M=$Mn^{2+}$, $Mg^{2+}$, $Zn^{2+}$, $Fe^{2+}$, $Co^{2+}$ or $Ni^{2+}$; x=0.1-0.95) have various advantages compared to known adsorbents. Certain of these advantages are described below.

a) These compounds constitute unique examples of universal ion exchangers. For example, the compound $K_{2x}Mn_xSn_{3-x}S_6$ (x=0.1-0.95) used alone may be highly effective in various remediation processes that usually need two or more different materials. This can be very important from the economical point of view. Clays, zeolites and titanosilicates are excellent adsorbents for cesium and strontium, but they display low selectivity and binding affinity for mercury.

b) These compounds display remarkable selectivity for $Cs^+$ and $Sr^{2+}$ over hard ions like $Na^+$ or $H^+$. They are also rare examples of inorganic ion exchangers with significant exchange capacity for $Sr^{2+}$ in acidic environments.

c) These compounds can be prepared with a low cost and environmentally friendly synthetic procedure and they are remarkably stable in water and air. They display high exchange capacity for a variety of soft heavy metal ions such as $Hg^{2+}$, $Pb^{2+}$, $Cd^{2+}$ and $Ag^+$. Thus, these materials exhibit distinctive advantages over thiol-functionalized adsorbents, which are prepared with a high cost synthesis (due to the use of expensive organic surfactants, organic solvents and organosilane) and display air/water instability arising from the tendency of the thiol-groups to be oxidized to disulfide ones. In addition, most thiol-functionalized adsorbents display low adsorption capacity for lead or cadmium;

d) The solid chalcogenic acids $H_{2x}M_xSn_{3-x}S_6$ (M=$Mn^{2+}$, $Mg^{2+}$, $Zn^{2+}$, $Fe^{2+}$; x=0.1-0.95) display an amazing selectivity and remediation capacity for $Hg^{2+}$ reducing $Hg^{2+}$ concentrations even 10 times less than the limit for the drinking water. Unlike mesoporous thiol-functionalized materials (mercury adsorbents that lose up to half of their capacity after one regeneration cycle), compounds of the formula $H_{2x}M_xSn_{3-x}S_6$ (M=$Mn^{2+}$, $Mg^{2+}$, $Zn^+$, $Fe^{2+}$; x=0.1-0.95), such as $H_{0.3}M_{0.15}Sn_{2.85}S_6$ can be easily regenerated and reused with only a slightly loss of their exchange capacity. In addition, compounds such as $H_{0.4}M_{0.2}Sn_{2.8}S_6$ display remarkable mercury capture in highly acidic media where most known adsorbents are inactive, especially the oxides.

The synthesis of compounds of the general formula $A_{2x}M_xSn_{3-x}S_6$, where x=0.1-0.95; A=$Li^+$, $Na^+$, $K^+$ or $Rb^+$; and M=$Mn^{2+}$, $Mg^{2+}$, $Zn^{2+}$, $Fe^{2+}$, $Co^{2+}$ or $Ni^{2+}$ can be achieved with various methods as further described below. An attractive method of synthesis of these compounds from an economical point of view is hydrothermal synthesis involving the reaction:

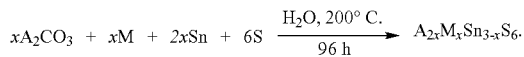

Figure 1B:
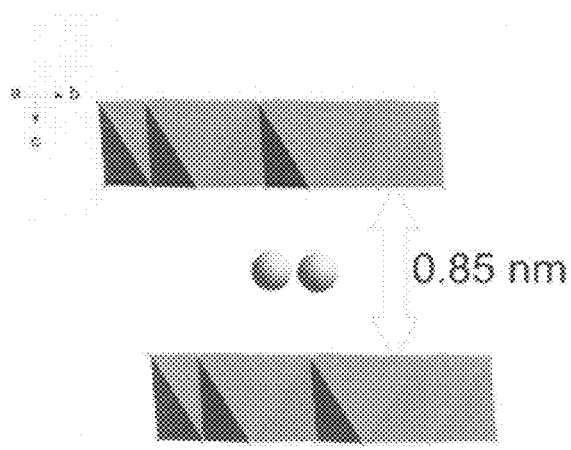
FIG. 1B is a view of the structure depicted in FIG. 1A, with a polyhedral representation of the layers, along the c-axis wherein highly disordered $K^+$ ions shown as gray balls are hosted in the interlayer space.

Compounds of the formula $A_{2x}M_xSn_{3-x}S_6$ crystallize in the centrosymmetric trigonal space group R-3m. Their architecture belongs to a common structure type ($CdI_2$ structure type) adopted, among others, by layered double hydroxides. The layer is built up by edge-sharing "M, Sn" $S_6$ octahedra with Mn and Sn atoms occupying the same crystallographic position and all sulfur ligands being three-coordinated as shown in FIG. 1. The $A^+$ ions intercalated between the layers are positionally disordered.

Figure 2:
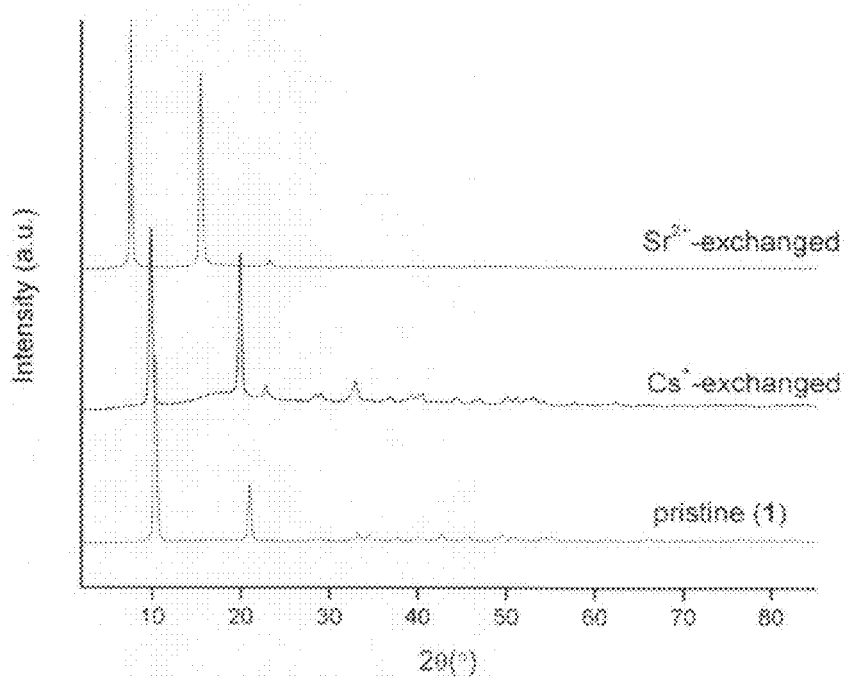
FIG. 2 shows X-ray diffraction patterns for pristine compounds of the formula $K_{2x}Mn_xSn_{3-x}S_6$ (x=0.1-0.95) and the cesium and strontium exchanged products of these compounds.

Compounds of the formula $A_{2x}M_xSn_{3-x}S_6$ may be used as ion exchangers. Exemplary test results for compounds of the formula $K_{2x}Mn_xSn_{3-x}S_6$ (x=0.1-0.95) {i.e., compounds (1)} are provided in Table 1. The ion exchange of compounds (1) with $Cs^+$ and $Sr^{2+}$ is topotactic as can be seen from FIG. 2 and is accompanied by an oxidation of $Mn^{II}$ to $Mn^{III}$ possibly induced by the atmospheric oxygen:

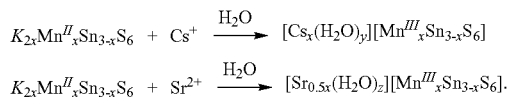

This oxidation was confirmed by single crystal diffraction analysis of the Cs-exchanged product, X-ray Photoelectron Spectroscopy data for $Cs^+$ and $Sr^{2+}$ exchanged materials and EDS analytical data which is shown in Table 1.

TABLE 1

Selected data for $K_{2x}Mn_xSn_{3-x}S_6$ (x = 0.1-0.95) (1) and its $Cs^+$ and $Sr^{2+}$ exchanged analogues

| Compound | $d_{003}$(Å)/ hydration | c-axis (Å) | Mn2p binding energy(eV)/ Mn oxidation state |
|---|---|---|---|
| $K_{2x}Mn_xSn_{3-x}S_6$ (x = 0.5-0.95) | 8.53/2 8.66/5 | 25.59-25.98 | 640.4/$Mn^{2+}$ |
| $Sr_{0.5x}Mn_xSn_{3-x}S_6$ (x = 0.5-0.95) | 11.78/5.0 | 35.34 | 641.4/$Mn^{3+}$ |
| $Cs_xMn_xSn_{3-x}S_6$ (x = 0.5-0.95) | 9.02/1.8 | 27.05 | 641.1/$Mn^{3+}$ |

$Cs^+$ and $Sr^{2+}$-remediation properties of various compounds of the formula (1) were also tested. Selected results are presented in Table 2. The maximum $Cs^+$ and $Sr^{2+}$ exchange capacities of the compounds (1) were found to be 1.66 mmol/g and 0.88 mmol/g respectively. The cesium exchange capacity of compounds (1) compares well with that of the most efficient Cs adsorbents (e.g. zeolites and zirconium-titanium silicates exhibiting capacities 1.86-4.1 mmol/g). The observed capacity of compounds (1) for $Sr^{2+}$ also compares well with that of best $Sr^{2+}$ ion exchangers (1.0-2.0 mmol/gr) reported. The maximum distribution coefficient $K_d$ value for $Cs^+$ ion exchange was found to be $1.59 \times 10^4$ mL/g which also compares well to those of the most efficient $Cs^+$ ion exchangers. The maximum $K_d$ value for the $Sr^{2+}$ ion exchange was found to be $1.58 \times 10^5$ mL/g which is among the highest reported in the literature for $Sr^{2+}$ adsorbents.

Competitive $Cs^+$—$Na^+$ and $Sr^{2+}$—$Na^+$ ion exchange experiments revealed high selectivity of compounds (1) for $Cs^+$ or $Sr^{2+}$. This is apparent when looking the distribution coefficient values of cesium or strontium which are much higher than those of sodium (Table 2). This selectivity of compounds (1) for $Cs^+$ or $Sr^{2+}$ against $Na^+$ is highly desired for nuclear waste remediation, since the waste water usually contains very high $Na^+$ concentrations.

The competitive experiments also included $Sr^{2+}/Cs^+$. The initial $Sr^{2+}$ and $Cs^+$ concentrations were $5 \times 10^{-2}$ and $6.9 \times 10^{-2}$ mM respectively. These experiments were performed with the simultaneous presence of $Na^+$ (1.1 mM), $Ca^{2+}$ ($2.8 \times 10^{-1}$ mM) and $Mg^{2+}$ ($1.5 \times 10^{-1}$ mM) in an alkaline environment (i.e., at a pH of about 11), aiming to simulate alkaline waste solutions where $Cs^+$ and $Sr^{2+}$ coexist with a number of competitive cations of much higher concentration. Various experiments were conducted by applying different volume to mass ratios. Representative results are presented in Table 2. The $K_d^{Cs}$ and $K_d^{Sr}$ values obtained revealed that the $K_{2x}Mn_xSn_{3-x}S_6$ (x=0.5-0.95) materials display higher selectivity for $Cs^+$ over $Sr^{2+}$ only at a volume to mass ratio of about 238 mL/g. It is interesting that for larger ratios a dramatic increase in the selectivity of compounds (1) for $Sr^{2+}$ over $Cs^+$ was observed. For example, the $K_d^{Sr}$ was found to be about 9.7 times higher than the $K_d^{Cs}$ at a volume to mass ratio of about 990 mL/g. An increase of the $K_d^{Sr}$ as the volume to mass ratio is increased has been also observed in the case of titanates and pharmacosiderites.

Overall, the results of these competitive experiments revealed that for practical applications, compounds (1) are more suitable as $Sr^{2+}$ adsorbents than as $Cs^+$ adsorbents, since these compounds can efficiently sequester $Sr^{2+}$ from relatively large volumes of water solutions. In contrast, only in the absence of $Sr^{2+}$ do compounds (1) appear to be capable of specific $Cs^+$ capture.

TABLE 2

Selected data for $Cs^+$ and $Sr^{2+}$ ion exchange experiments.

| | Exchanging Cations | | | | | |
|---|---|---|---|---|---|---|
| | $Cs^+$ | $Sr^{2+}$ | $Cs^+ + Na^+$ (1:11) | $Sr^{2+} + Na^+$ (1:39) | $Sr^{2+} + Ca^{2+} + Mg^{2+} + Na^+ + Cs^+$ |
| Initial Concentration (ppm) | 470.3 | 48.6 | 157.5 | 4.6 | 478.6 (Cs) 920 (Na) | 121.84 (Sr) 1231.3 (Na) | 3.70 (Mg) 11.14 (Ca) 4.59 (Sr) 9.17 (Cs) 25.96 (Na) |
| pH | about 7 | about 7 | about 5.9 | about 7 | about 7 | about 5.9 | about 11 |
| volume to mass ratio (ml/g) | about 1000 | about 1000 | about 1000 | about 1000 | about 1000 | about 1000 | about 238 |
| Final concentration (ppm) | 243.4 | 2.9 | 80.0 | 0.03 | 273.6 (Cs) 787.8 (Na) | 76.23 (Sr) 1177 (Na) | 0.45 (Mg) 1.85 (Ca) 0.48 (Sr) |

TABLE 2-continued

Selected data for Cs$^+$ and Sr$^{2+}$ ion exchange experiments.

| | \multicolumn{5}{c}{Exchanging Cations} | | | | |
|---|---|---|---|---|---|
| | Cs$^+$ | Sr$^{2+}$ | Cs$^+$ + Na$^+$ (1:11) | Sr$^{2+}$ + Na$^+$ (1:39) | Sr$^{2+}$ + Ca$^{2+}$ + Mg$^{2+}$ + Na$^+$ + Cs$^+$ |
| % Removal | 48.2 | 94.0 | 49.2 | 99.3 | 42.8 (Cs) | 37.4 (Sr) | 0.58 (Cs) 21.84 (Na) 89.5 (Sr) 93.6 (Cs) |
| Adsorption capacity (mmol/gr) | 1.66 | — | 0.88 | — | 1.5 | 0.53 (Sr) | — |
| K$_d$ (mL/g) | 905 | 1.59 × 10$^4$ | 968 | 1.58 × 10$^5$ | 713.5 (Cs) 159.8 (Na) | 592.4 (Sr) 45.68 (Na) | 1.74 × 10$^3$ (Mg) 1.20 × 10$^3$ (Ca) 2.04 × 10$^3$ (Sr) 3.53 × 10$^3$ (Cs) 44.9 (Na) |

Figures 3A, 3B:
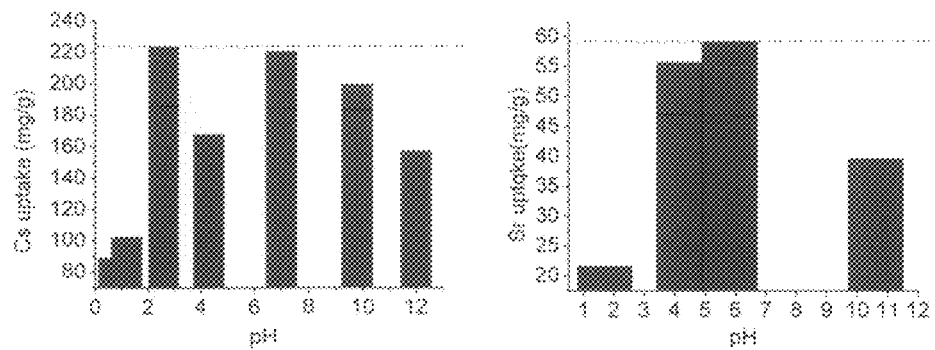
FIGS. 3A and 3B are bar charts showing $Cs^+$ uptake (FIG. 3A) and $Sr^{2+}$ uptake (FIG. 3B) by $K_{2x}Mn_xSn_{3-x}S_6$ (x=0.95) as a function of pH wherein the dashed lines indicate the maximum cesium or strontium capacity.

Cs$^+$ ion exchange experiments of compounds (1) with solutions of varying pH (i.e., 0.7-12) were conducted. The results demonstrated that compounds (1) exhibit significant Cs$^+$ uptake over the whole pH range tested (FIG. 3A). Variable pH Sr$^{2+}$ ion-exchange experiments were also performed. The results are shown in FIG. 3B. As shown in FIG. 3B, compounds (1) display capture of Sr$^{2+}$ in acidic media (pH about 2-4), which is superior over most inorganic exchangers reported.

Compounds of the general formula A$_{2x}$M$_x$Sn$_{3-x}$S$_6$ (x=0.1-0.95; A=K$^+$, Rb$^+$; M=Mn$^{2+}$, Mg$^{2+}$, Zn$^{2+}$, Fe$^{2+}$) display a capacity for exchange with soft heavy metal ions like Hg$^{2+}$, Pb$^{2+}$, Cd$^{2+}$, Ag$^+$. Results are described for K$_{2x}$Mn$_x$Sn$_{3-x}$S$_6$ (x=0.1-0.95) compounds {i.e., compounds (1)}. EDS and ICP-AES data for the exchanged materials confirmed the complete removal of K$^+$ ions and the presence of the heavy metal ions (Table 3).

TABLE 3

Selected data for the heavy metal ion exchanged products of Compounds (1)

| Exchanged Material (average formula from EDS) | c-axis (Å) | Band gap energy (eV) |
|---|---|---|
| HgMn$_{0.6}$Sn$_{2.3}$S$_6$ | 17.47 | 0.74 |
| PbMnSn$_{2.3}$S$_6$ | 26.05, 24.28 | 0.90 |
| Cd$_{1.8}$Sn$_{2.1}$S$_6$ | 18.45, 19.01 | 1.96 |
| Ag$_{2.4}$MnSn$_2$S$_{5.5}$ | 19.22 | 0.82 |

Figure 4:
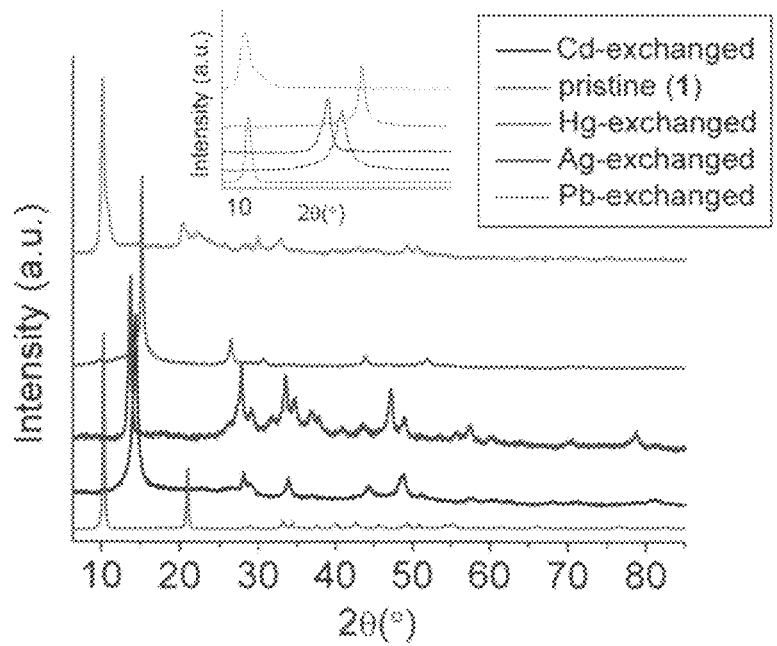
FIG. 4 is a graph showing PXRD patterns for pristine compounds of the formula $K_{2x}Mn_xSn_{3-x}S_6$ (x=0.1-0.95) and the $Hg^{2+}$, $Ag^+$, $Cd^{2+}$ and $Pb^{2+}$ exchanged compounds wherein the inset shows an enlarged view of the (003) peaks.

PXRD and solid state NIR-UV-Vis reflectance data are given in FIG. 4 and Table 3 respectively. Although Hg$^{2+}$, Pb$^{2+}$ and Ag$^+$ replace only the interlayer K$^+$ ions, the Cd$^{2+}$ exchanges with the intra-layer Mn$^{2+}$ in addition to the K$^+$ ions. The exchange of manganese by cadmium was confirmed by EDS analysis on the solid after the ion-exchange process which revealed an average formula of Cd$_{1.8}$Sn$_{2.1}$S$_6$.

Figure 5:
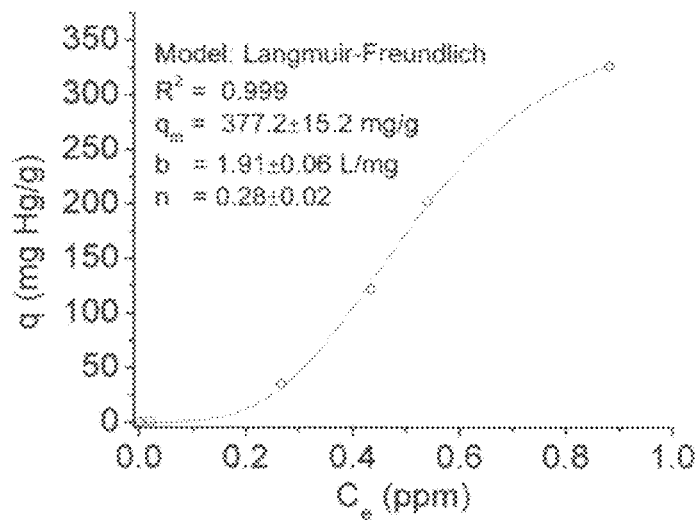
FIG. 5 is a graph showing equilibrium data for $Hg^{2+}$ ion exchange.
Figure 6:
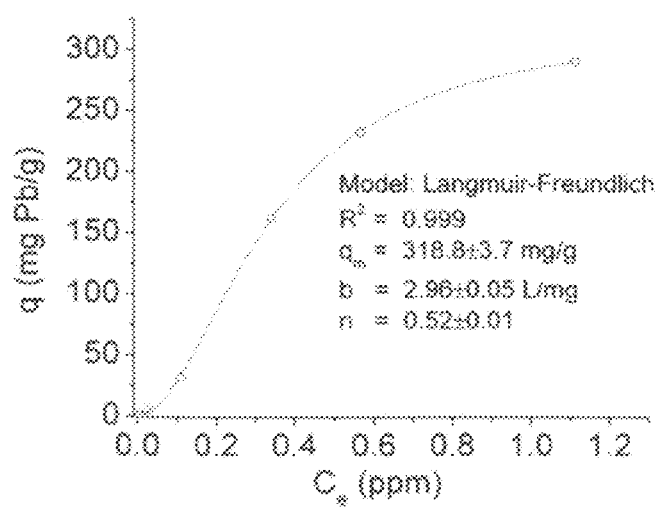
FIG. 6 is a graph showing equilibrium data for $Pb^{2+}$ ion exchange.

The Hg$^{2+}$ and Pb$^{2+}$ ion exchange equilibrium data are graphed in FIGS. 5 and 6 respectively. A fit of the data (correlation coefficient R$^2$=0.999) was performed with the Langmuir-Freundlich (LF) isotherm model (1) expressed as $$q = q_m \frac{(bC_e)^{\frac{1}{n}}}{1 + (bC_e)^{\frac{1}{n}}} \quad (1)$$

where q (mg/g) is the amount of the cation adsorbed at the equilibrium concentration C$_e$ (ppm), q$_m$ is the maximum adsorption capacity of the adsorbent, and b and n are constants.

The maximum Hg$^{2+}$ and Pb$^{2+}$ exchange capacities calculated by the LF isotherm are 377.2±15.2 mg/g and 318.8±3.7 mg/g, respectively. These values are in reasonable agreement with the theoretical Hg (338.9 mg/g) and Pb (350.1 mg/g) exchange capacities for the material K$_{2x}$Mn$_x$Sn$_{3-x}$S$_6$ (x=0.95). The observed Hg$^{2+}$ exchange capacity (about 1.88±0.08 mmol/g) of compounds (1) is comparable to those of mesoporous thiol-functionalized silicates and other thiol-functionalized adsorbents (1.5-7.2 mmol/g). The Pb$^{2+}$-exchange capacity (about 1.54±0.02 mmol/g) of compounds (1) exceeds that of thiol-functionalized montmorillonite materials (0.14-0.35 mmol/g), and microporous titanosilicates (0.84-1.12 mmol/g), while it is slightly lower than that of thiol-functionalized phyllosilicate clay (1.76 mmol/g). The framework density of compounds (1) (about 3.1 g/cm$^3$) is much higher than that of silicate clays (about 2.0 g/cm$^3$). Given the density difference between compounds (1) and silicates, the Pb$^{2+}$ adsorption capacity of compounds (1) is actually equivalent to that of a silicate with capacity of about 2.3 mmol/g.

It is remarkable that compounds (1) have proven to be efficient at eliminating Hg$^{2+}$ at ppb levels. Specifically, compounds (1) may reduce an initial Hg$^{2+}$ concentration of 42 ppb down to 0.2-0.7 ppb, which is about 4-10 times lower than the acceptable limit for Hg$^{2+}$ in drinking water. Thus, compounds (1) may be used in applications for the treatment of wastes with extremely low yet highly toxic Hg concentrations (e.g., <50 ppb). Chemical precipitation is inactive for such wastes and thus adsorbents that can function in such low Hg concentrations are desirable.

Figure 7A:
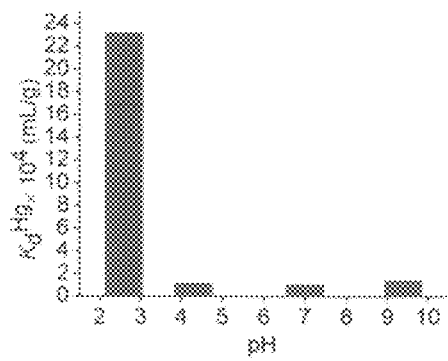
FIGS. 7A and 7B are bar charts showing the variation with pH of the distribution coefficients for $Hg^{2+}$ (FIG. 7A) and $Pb^{2+}$ (FIG. 7B) exchange of compounds of the formula (1).
Figure 7B:
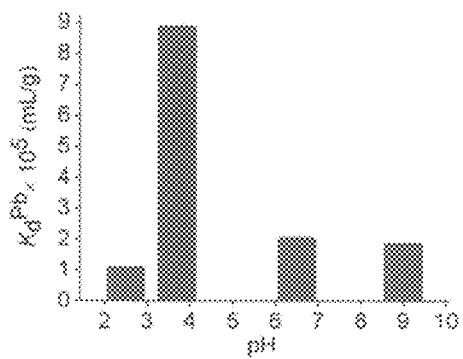

The effect of pH on the Hg$^{2+}$ and Pb$^{2+}$ ion exchange has also been studied. The pH range studied was 2.6-9.4 and the initial Hg$^{2+}$ and Pb$^{2+}$ concentrations were 4-7 ppm. The results demonstrated that the affinity of compounds (1) for Hg$^{2+}$ or Pb$^{2+}$ is significant across the whole pH range tested (FIGS. 7A and 7B). The compounds (1) displayed the maximum distribution coefficient value (K$_d$ about 2.3×10$^5$ mL/g) for Hg$^{2+}$ at a pH of about 2.6, while no significant deviation has been observed in the affinity of compounds (1) for Hg$^{2+}$ at pH>4 ($K_d$=1.1-1.3×10$^4$ mL/g). The Pb$^{2+}$ distribution coefficients calculated for compounds (1) at various pH values range from 1.1-8.9×10$^5$ mL/g. The maximum affinity of compounds (1) for Pb$^{2+}$ was observed at a pH of 3.7.

Figure 8A:
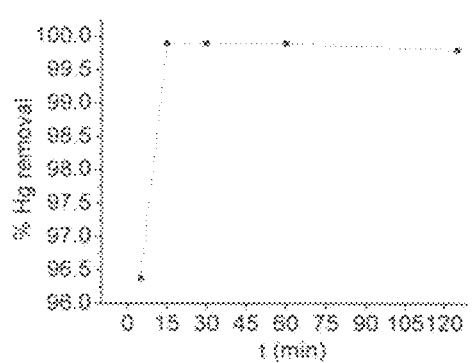
FIGS. 8A and 8B are graphs showing the kinetics for $Hg^{2+}$ (FIG. 8A) and $Pb^{2+}$ (FIG. 8B) ion-exchange of compounds of the formula (1).
Figure 8B:
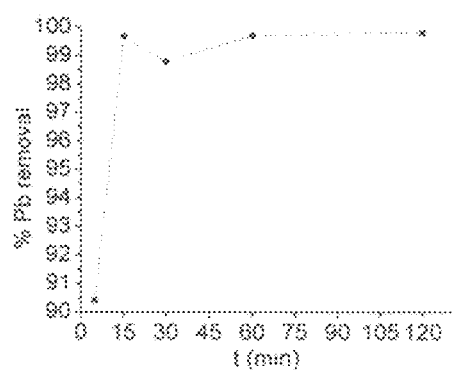

The Hg$^{2+}$ and Pb$^{2+}$ exchange kinetics data, obtained at room temperature and at a pH of about 5, for compounds (1) are presented in FIGS. 8A and 8B. The initial Hg$^{2+}$ and Pb$^{2+}$ concentrations used were 347.5 (0.97 equivalents) and 246.2 (0.66 equivalents) ppm respectively. As can be seen from FIGS. 8A and 8B, the adsorption of Hg$^{2+}$ and Pb$^{2+}$ is remarkably fast. Moreover, within only 5 min, compounds (1) can remove 96.4% of Hg$^{2+}$ and 90.4% of Pb$^{2+}$ from the solution. The equilibrium for both Hg$^{2+}$ and Pb$^{2+}$ exchange processes seems to be reached in only about 15 min.

Contaminated groundwater and waste streams usually contain alkali and alkali-earth cations in higher concentrations than those of contaminants (e.g. heavy metal ions). Thus, the effect of high background electrolyte levels on the mercury and lead absorption by compounds (1) has been also investigated. The results showed that the affinity of compounds (1) for Hg$^{2+}$ or Pb$^{2+}$ remains almost unaffected in the presence of large excess of Na$^+$ or Ca$^{2+}$ (Table 4). It is remarkable that even in the presence of extremely high Na$^+$ or Ca$^+$ concentrations (e.g., about 1 M), the $K_d^{Hg}$ values were found as high as 10$^5$ mL/g (in the presence of sodium) and 8.9×10$^4$ mL/g (in the presence of calcium). The high Pb$^{2+}$ exchange capacity and selectivity of compounds (1) is also retained in the presence of about 1 M NaCl ($K_d^{Pb}$=8.3×10$^4$ mL/g) or about 1 M CaCl$_2$ ($K_d^{Pb}$=1.9×10$^4$ mL/g). Without wishing to be being bound by theory, it is believed that the presence of the soft sulfide ligands induces the compounds (1) to exhibit a high selectivity for Hg$^{2+}$ or Pb$^{2+}$ against hard ions like Na$^+$ or Ca$^{2+}$. This property of compounds (1) makes them superior heavy metal ion adsorbents as compared to traditional oxidic ion exchangers which exhibit decreased capacity for soft metal ions in the presence of high background electrolyte concentrations.

Solid chalcogenic acids of the general formula $H_{2x}M_xSn_{3-x}S_6$ (M=Mn$^{2+}$, Mg$^{2+}$, Zn$^{2+}$, Fe$^{2+}$; x=0.1-0.95) can be produced with treatment of $A_{2x}M_xSn_{3-x}S_6$ with 0.6 M HCl acid according to equation:

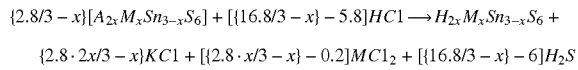

$$\{2.8/3 - x\}[A_{2x}M_xSn_{3-x}S_6] + [\{16.8/3 - x\} - 5.8]HCl \longrightarrow H_{2x}M_xSn_{3-x}S_6 +$$
$$\{2.8 \cdot 2x/3 - x\}KCl + [\{2.8 \cdot x/3 - x\} - 0.2]MCl_2 + [\{16.8/3 - x\} - 6]H_2S$$

Figure 10:
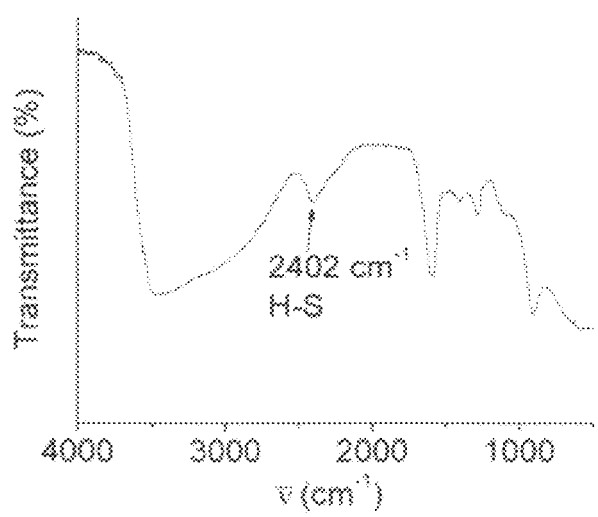
FIG. 10 is a Mid-IR spectrum of the solid acid of the formula $H_{0.4}Mn_{0.2}Sn_{2.8}S_6$ {i.e., compound (2)}.
Figure 11:
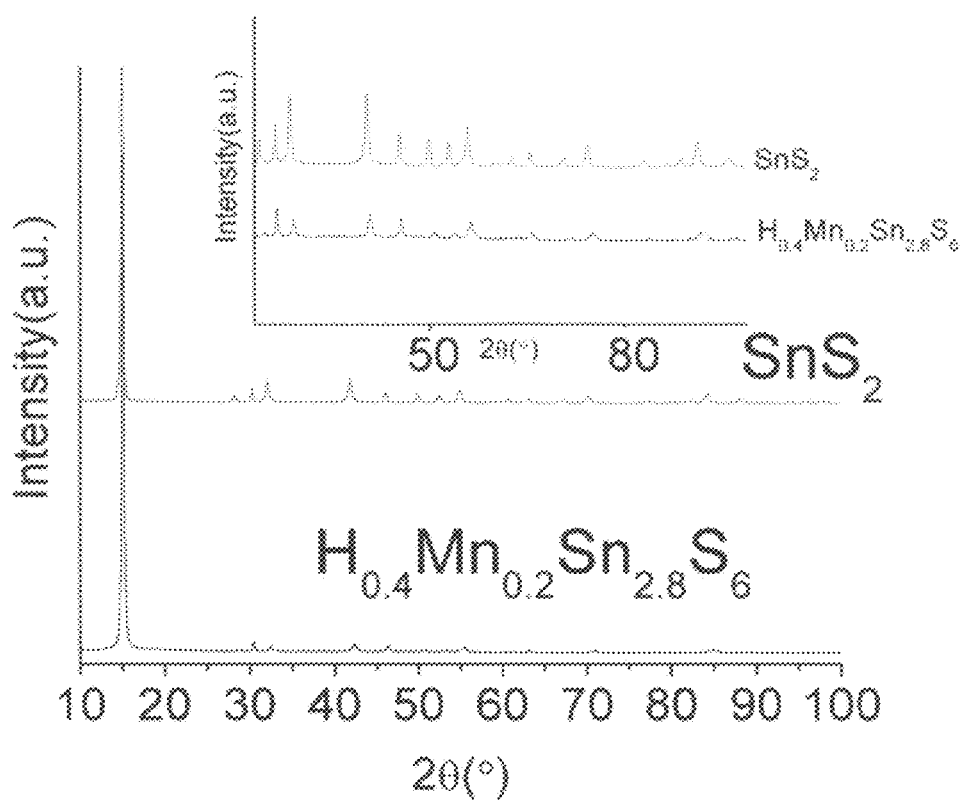
FIG. 11 is a PXRD of compound (2) vs. $SnS_2$.

According to the above equation, $H_{2x}M_xSn_{3-x}S_6$ (M=Mn$^{2+}$, Mg$^{2+}$, Zn$^{2+}$, Fe$^{2+}$, Co$^{2+}$ or Ni$^{2+}$; x=0.1-0.95) can be formed by decomposition of $A_{2x}M_xSn_{3-x}S_6$ due to removal of M$^{2+}$ from the layer and attack of H$^+$ to sulfide atoms resulting in release of H$_2$S. In some embodiments, the compound is of the formula $H_{2x}M_xSn_{3-x}S_6$, wherein x is 0.15 or 0.20. The characterization of $H_{0.4}Mn_{0.2}Sn_{2.8}S_6$ {formula (2)} was achieved with powder X-ray diffraction (showing a layered structure similar to SnS$_2$), infrared spectroscopy (revealing the H—S bonds) and various additional analytical techniques (TGA, EDS, ICP-AES, pyrolysis-MS). Selected results are given in FIGS. 10 and 11 and in Table 5.

The soft heavy metal ion (Hg$^{2+}$, Cd$^{2+}$, Pb$^{2+}$, Ag$^+$) exchange properties of compound (2) have also been studied. Selected data for the Hg$^{2+}$/Ag$^+$ exchanged products of compound (2) are given in Table 5.

TABLE 5

Selected data for compound (2) and its Hg$^{2+}$ and Ag$^+$ exchanged analogues

| Formula | Cell parameters[c] | Band gap (eV) |
|---|---|---|
| H$_{0.4}$Mn$_{0.2}$Sn$_{2.8}$S$_6$[a] | a = 3.591(2) Å, c = 5.877(1) Å, V = 65.63 Å$^3$ | 1.0 |

TABLE 4

Results for the competitive Hg$^{2+}$—Na$^+$,[a] Hg$^{2+}$—Ca$^{2+}$,[b] Pb$^{2+}$—Na$^+$,[c] Pb$^{2+}$—Ca$^{2+}$ [d] experiments for compounds (1)

| Metal ions | Equivalents of metal ions | Initial (Hg or Pb) concentration (ppm) | Final (Hg or Pb) concentration (ppm) | % Removal of Hg or Pb | $K_d$ (mL/g) for Hg or Pb |
|---|---|---|---|---|---|
| Hg$^{2+}$/Na$^+$ (1 M) | 1/505 | 410.50 | 3.99 | 99.0 | 10$^5$ |
| Hg$^{2+}$/Ca$^{2+}$ (1 M) | 1/505 | 386.40 | 3.89 | 99.0 | 8.9 × 10$^4$ |
| Pb$^{2+}$/Na$^+$ (1 M) | 0.9/505 | 329.75 | 3.76 | 98.9 | 8.3 × 10$^4$ |
| Pb$^{2+}$/Ca$^{2+}$ (1 M) | 0.7/505 | 303.00 | 13.96 | 95.4 | 1.9 × 10$^4$ |

[a] pH of the initial solution about 6.5;
[b] pH of the initial solution about 2.1;
[c] pH of the initial solution about 5.0;
[d] pH of the initial solution about 4.6.

Figure 9:
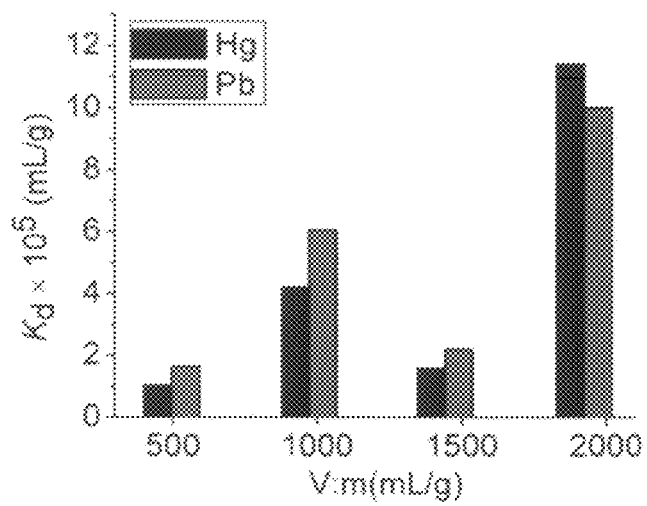
FIG. 9 is a bar chart showing $Hg^{2+}/Pb^{2+}$ distribution coefficients as function of volume to mass ratio determined for competitive ion exchange experiments with simultaneous presence of Hg (21.6 ppm) and Pb (18.6 ppm).

Ion-exchange experiments on competitive Hg$^{2+}$—Pb$^{2+}$ exchange were performed with the simultaneous presence of nearly equal molar concentrations of both cations and applying different volume to mass ratios (from 495-1923 mL/g). The results showed that the compounds (1) are capable of almost quantitative (99.1-99.8%) elimination of both Hg$^{2+}$ and Pb$^{2+}$ cations from solution. The comparison of $K_d^{Hg}$ and $K_d^{Pb}$ values obtained revealed that the materials are only slightly more selective for Pb$^{2+}$ over Hg$^{2+}$ at volume to mass ratio ratios about 495, 971 and 1442 mL/g, while they display slightly higher selectivity for Hg$^{2+}$ against Pb$^{2+}$ at volume to mass ratio of about 1923 (FIG. 9).

TABLE 5-continued

Selected data for compound (2) and its Hg$^{2+}$ and Ag$^+$ exchanged analogues

| Formula | Cell parameters[c] | Band gap (eV) |
|---|---|---|
| Hg$_{0.5}$Mn$_{0.2}$Sn$_{2.8}$S$_6$[b] | c = 5.84 Å | 0.8 |
| Ag$_{0.6}$Mn$_{0.2}$Sn$_{2.8}$S$_6$[b] | c = 6.17 Å | 1.4 |

[a] Formula found by ICP-AES;
[b] Average formula from EDS;
[c] Due to strong preferred orientation, mostly (001) reflections were apparent in the PXRD patterns of mercury and silver-exchanged materials and thus, accurate indexing of these patterns was not possible.

Figure 12:
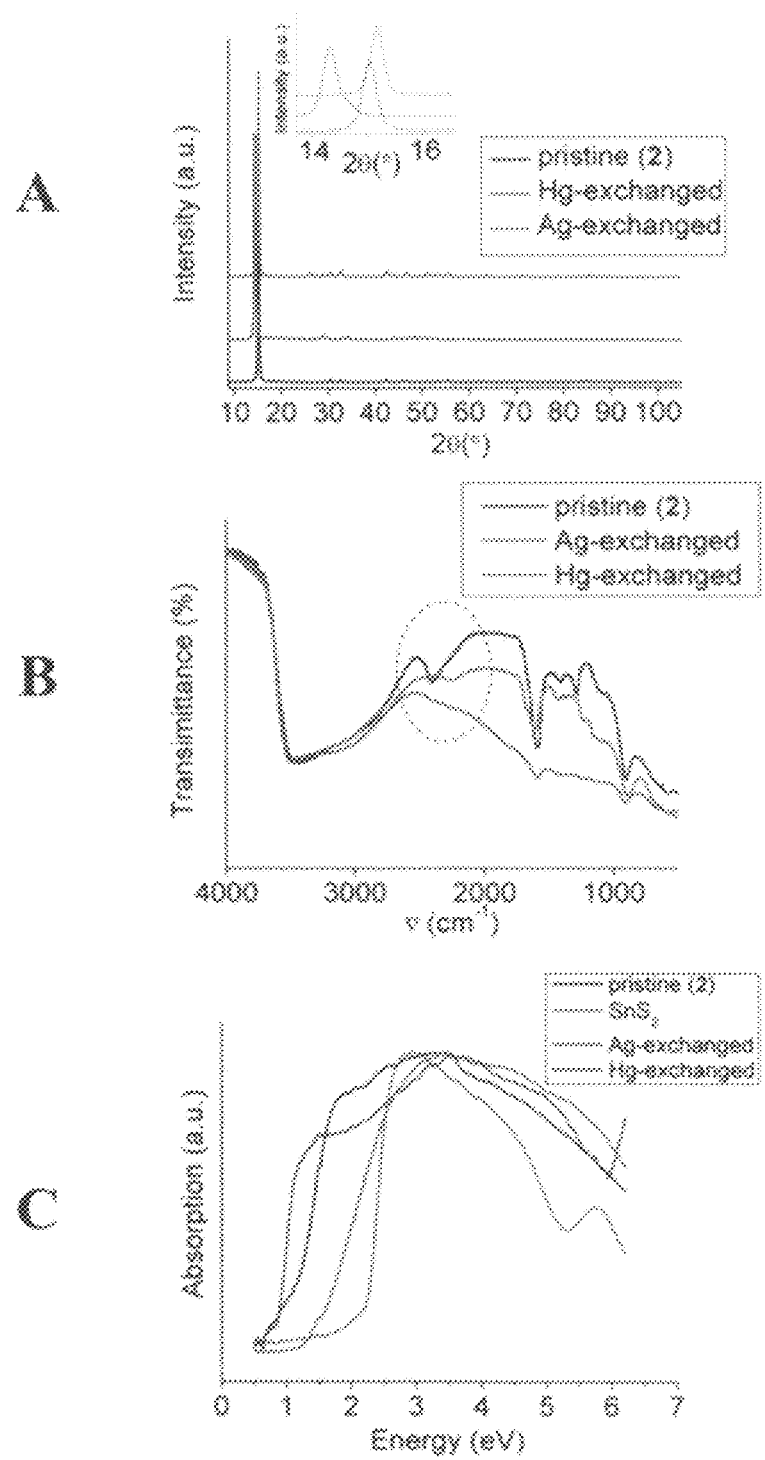
FIG. 12A shows PXRD patterns for pristine compound (2) and $Hg^{2+}$, $Ag^+$-exchanged materials wherein the inset shows an enlarged view of the (001) peaks of these patterns.
FIG. 12B shows the Mid-IR spectra of pristine compound (2) and $Ag^+$ and $Hg^{2+}$ exchanged materials wherein the H—S peak present in the spectrum of compound (2) can be seen to have disappeared in the spectra of $Ag^+$ and $Hg^{2+}$ exchanged materials as highlighted by the dashed oval.
FIG. 12C is a solid state NIR/UV-Vis spectra for pristine compound (2), $SnS_2$, $Hg^{2+}$ and $Ag^+$-exchanged materials.

PXRD (FIG. 12A) of the $Hg^{2+}$-exchanged compound (2) revealed a small shift (about 0.2°) of the (001) reflection to higher 2θ angles and thus, the calculated c-axis is slightly smaller than that of the pristine material (2) (Table 5). The $Ag^+$-exchanged compound (2) displayed a significantly longer c-axis (6.17 Å) than that of pristine compound (2) and its $Hg^{2+}$-exchanged analogue (FIG. 12A, Table 5). This is expected since Ag—S bonds (about 2.7 Å bond length) are typically longer than Hg—S bonds (about 2.5 Å bond length) ones.

Infrared spectroscopy has also been used to confirm the replacement of protons of compound (2) after the $Hg^{2+}$ and $Ag^+$ ion-exchange processes. Specifically, the characteristic IR peak of H—S bonds of compound (2) at 2403 $cm^{-1}$ were absent in the IR spectra of the $Ag^+$ and $Hg^{2+}$ exchanged materials, revealing the complete removal of $H^+$ as shown in FIG. 12B.

In addition, the intercalation of $Hg^{2+}$ and $Ag^+$ was further probed by solid-state NIR-UV-V is reflectance. The $Hg^{2+}$-exchanged compound exhibits a lower band gap (about 0.8 eV) than that of compound (2) (FIG. 12C). Such observations are consistent with the fact that the Hg—S covalent interactions are stronger than H—S ones. A blue shift of about 0.4 eV has been observed for the $Ag^+$-exchanged material as shown in FIG. 12C. Without wishing to be bound by theory, this may be explained by the intercalation of $Ag^+$ ions resulting in a significant expansion of the interlayer space of compound (2) and therefore, in weaker interlayer interactions.

The adsorption capacity of compound (2) for $Pb^{2+}$ and $Cd^{2+}$ was found to be smaller than that observed for $Hg^{2+}$ and $Ag^+$. As revealed by ICP-MS data, compound (2) can absorb about 50 and about 70% of the initial $Pb^{2+}$ and $Cd^{2+}$ concentrations respectively. The absorption of $Cd^{2+}$ and $Pb^{2+}$ by compound (2) is due to the decomposition of the framework, rather than the ion-exchange. The absence of a lead and cadmium exchange capacity for compound (2) was confirmed by IR spectroscopy and specifically, by the presence of the H—S peak at about 2400 $cm^{-1}$ in the IR spectrum of samples of compound (2) treated with solutions of $Pb^{2+}$ or $Cd^{2+}$. In addition, the PXRD patterns of these samples were almost identical with that of the pristine compound (2).

The inability of compound (2) to exhibit ion-exchange behavior with $Pb^{2+}$ and $Cd^{2+}$ and consequently, its low adsorption capacity for these metal ions as compared to that for $Hg^{2+}$ and $Ag^+$ can be explained with the concept of soft-hard acids and bases. It seems that the softness of $Pb^{2+}$ and $Cd^{2+}$ (and therefore their affinity for the sulfide ligands) is not high enough to favor replacement of the protons of compound (2) by these cations. Thus, $Pb^{2+}$ and $Cd^{2+}$ can be absorbed only through a decomposition of the framework to binary phases. In contrast, $Ag^+$ and $Hg^{2+}$ are soft enough to exchange the protons of compound (2) and therefore, the observed adsorption capacity of compound (2) for these cations is higher.

Figure 13:
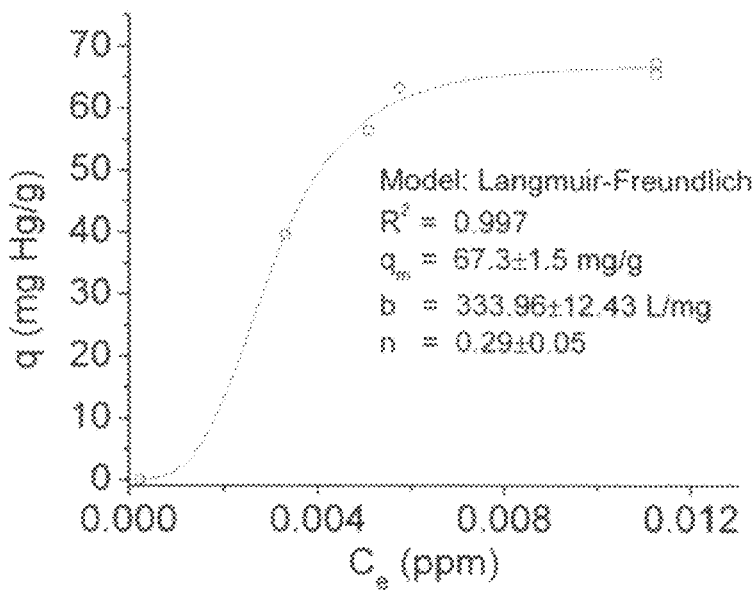
FIG. 13 is a graph showing equilibrium data for $Hg^{2+}$ ion-exchange of compound (2).

The mercury ion-exchange equilibrium data for compound (2) is presented in FIG. 13. The fit of the data was achieved with the Langmuir-Freundlich (LF) isotherm model (correlation coefficient $R^2$=0.997). This model predicts a maximum $Hg^{2+}$ exchange capacity of compound (2) equal to 67.3±1.5 mg/g. The material displays an enormous affinity for $Hg^{2+}$ reflected in the calculated distribution coefficient $K_d^{Hg}$ values ranging from $1.74 \times 10^5$ to $1.10 \times 10^7$ mL/g. These $K_d$ values for compound (2) exceed those reported for commercial resins ($1.80 \times 10^4$-$5.10 \times 10^5$ mL/g) and silane chelating fibers ($3.00 \times 10^5$-$3.80 \times 10^6$ mL/g) and they compare well with the $K_d^{Hg}$ values for mesoporous thiol-functionalized silicates ($3.40 \times 10^5$-$1.01 \times 10^8$ mL/g).

Compound (2) is also capable of remediation of $Hg^{2+}$ in extremely low initial concentrations (42 ppb), reducing mercury content levels as low as about 0.2 ppb. Such levels are about ten times lower than the established acceptable levels for drinking water.

$Hg^{2+}$ adsorption by compound (2) is practically unaffected by the pH of the solutions, as shown in Table 6. Specifically, the percentage of mercury removal remained very high (99.0-99.8%) over the entire tested pH range. Remarkably, the compound was found to efficiently capture $Hg^+$, and even in 1.2 M HCl solutions (i.e., under highly competitive $H^+$ conditions for $Hg^{2+}$-exchange) about 99.8% of the initial $Hg^{2+}$ content was eliminated.

As expected, high electrolyte concentrations do not appear to affect the $Hg^{2+}$ adsorption by compound (2). Specifically, in the presence of about 20-fold excess of $Na^+$ (about 0.07 M $Na^+$), the $K_d^{Hg}$ value was found $10^7$ mL/g (Table 8). A high removal capacity (97.4-99.1%) of compound (2) for $Hg^{2+}$ is retained even in the presence of $Na^+$ or $Ca^{2+}$ in concentrations as high as 1 M (Table 6).

A competitive experiment with the presence of equal molar concentrations of $Hg^{2+}$, $Ag^+$, $Pb^{2+}$, $Cd^{2+}$ (about 0.8 mM, total equivalents about 0.06), was also performed. The ICP-MS analysis data revealed that $Hg^{2+}$ and $Ag^{2+}$ were quantitatively absorbed (99.99%), while only 65-66% of the initial $Pb^{2+}$ and $Cd^{2+}$ amounts were removed from the solution (Table 6). This result is consistent with the fact that compound (2) is selective for cations with high softness which are able to substitute the interlayer protons of this material. The volume to mass ratio used in these experiments was 1000 mL/g with the exceptions of $Hg^{2+}$—$Na^+$ (0.07 M) and $Hg^{2+}$—$Pb^{2+}$—$Cd^{2+}$—$Ag^+$ experiments performed with volume to mass ratio ratios of 500 and 200 mL/g, respectively.

TABLE 6

Data for $Hg^{2+}$ ion exchange of compound (2) at various pH and results of competitive ion exchange experiments

| Metal ion | Equiv. of metal ion | Initial concentration (ppb) | Final concentration (ppb) | % Removal | $K_d$ (mL/g) |
|---|---|---|---|---|---|
| Hg (pH about 0) | 0.02 | 6693 | 10.6 | 99.84 | $6.64 \times 10^5$ |
| Hg (pH about 7) | 0.02 | 6013 | 17.9 | 99.70 | $3.32 \times 10^5$ |
| Hg (pH about 9) | 0.02 | 6255 | 63.2 | 98.98 | $9.42 \times 10^4$ |
| $Hg^{2+}/Na^+$ (0.07 M)[a] | 0.2/20 | 141430 (Hg) | 5.8 (Hg) | 99.99 | $10^7$ |
| $Hg^{2+}/Na^+$ (1 M)[a] | 0.2/500 | 82100 (Hg) | 867 (Hg) | 99.10 | $8.5 \times 10^4$ |
| $Hg^{2+}/Ca^{2+}$ (1 M)[b] | 0.2/500 | 77275 (Hg) | 2137 (Hg) | 97.39 | $3.2 \times 10^4$ |
| $Hg^{2+}$ | 0.015 | 152960 | 5.2 | 99.99 | $5.46 \times 10^6$ |
| $Pb^{2+}$ | 0.015 | 175160 | 59360 | 66.11 | — |

TABLE 6-continued

Data for $Hg^{2+}$ ion exchange of compound (2) at various pH and results of competitive ion exchange experiments

| Metal ion | Equiv. of metal ion | Initial concentration (ppb) | Final concentration (ppb) | % Removal | $K_d$ (mL/g) |
|---|---|---|---|---|---|
| $Cd^{2+}$ | 0.015 | 91100 | 31680 | 65.22 | — |
| $Ag^+$ | 0.015 | 82540 | 1.6 | 99.99 | $9.08 \times 10^6$ |

[a]pH of the initial solution about 6.5;
[b]pH of the initial solution about 2.1.

Figure 14:
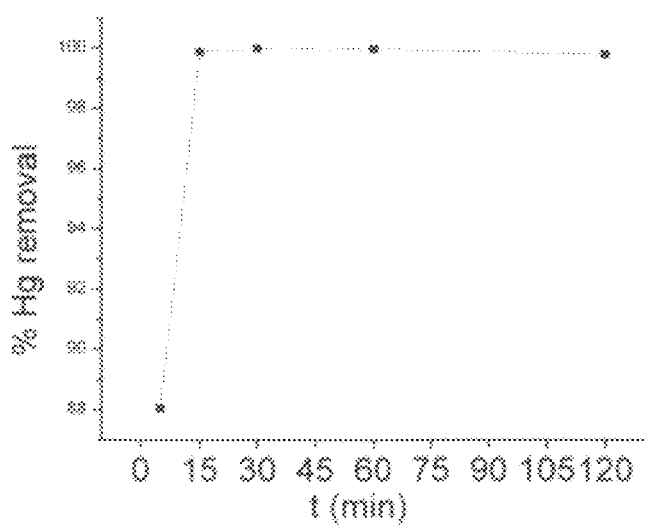
FIG. 14 is a graph showing the kinetics for $Hg^{2+}$ ion-exchange of compounds of the formula (1).

The $Hg^{2+}$ exchange kinetics data for compound (2) are graphed in FIG. 14. The initial mercury concentration used was 69.5 ppm and the volume to mass ratio ratio was about 1000. The data shows that the kinetics of $Hg^{2+}$ adsorption is fast, with the exchange equilibrium reached in only 15 min.

Compounds of the formula $H_{2x}M_xSn_{3-x}S_6$ wherein x is 0.15 or 0.20 are stable in strong acidic conditions. Thus, regeneration of $H_{0.3}Mn_{0.15}Sn_{2.85}S_6$ was possible by treating its $Hg^{2+}$-exchanged analogue with highly concentrated hydrochloric acid. Reaction with 12 M HCl resulted in ~93% removal of $Hg^{2+}$ from the solid as found by ICP-AES. However, this procedure resulted in the dissolution of ~40% of the material. Regeneration with minimum dissolution (~10-15%) was achieved by treating twice the Hg-exchanged material with 8 M HCl acid. The regeneration of the ion-exchanger was easily followed by IR spectroscopy as the variation in the intensity of the H—S stretching band at ~2400 cm$^{-1}$. This band invisible in the IR spectra of fully exchanged $Hg^{2+}$-samples reappeared in the spectra of the acid-treated samples. Ion-exchange of a regenerated material with $Hg^{2+}$ has been also performed. The mercury load of the exchanged solid was found about 48.8 mg/g, which is ~87.5% of the theoretical $Hg^{2+}$ exchange capacity (55.8 mg/g) of the pristine material $H_{0.3}Mn_{0.15}Sn_{2.85}S_6$. This result indicated that the regeneration process only slightly modify the exchange capacity of the compound.

One skilled in the art will readily realize that all ranges discussed herein also describe all subranges therein for all purposes and that all such subranges are also provided. Any listed range can be easily recognized as sufficiently describing the same range being broken down into at least equal halves, thirds, quarters, fifths, tenths, etc. As a non-limiting example, each range discussed herein can be readily broken down into a lower third, middle third and upper third, etc.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

EXAMPLES

The present invention, thus generally described, will be understood more readily by reference to the following examples, which are provided by way of illustration and are not intended to be limiting.

Synthetic methods for the preparation of $K_{2x}Mn_xSn_{3-x}S_6$ (1) (x=0.1-0.95) and $H_{0.4}Mn_{0.2}Sn_{2.8}S_6$ compounds are described. Similar procedures can be followed for synthesis of other compounds of the formula $A_{2x}M_xSn_{3-x}S_6$ and $H_{0.4}M_{0.2}Sn_{2.8}S_6$ (x=0.1-0.95; A=Li$^+$, Na$^+$, K$^+$, Rb$^+$; M=Mn$^{2+}$, Mg$^{2+}$, Zn$^{2+}$, Fe$^{2+}$).

Synthesis of $K_{2x}Mn_xSn_{3-x}S_6 \cdot yH_2O$ (x=0.5-0.95; y=2-5) Compounds (1)

A) Solid State Synthesis

A mixture of Sn (1.9 mmol, 226 mg), Mn (1.1 mmol, 60 mg), $K_2S$ (2 mmol, 220 mg), and S (16 mmol, 512 mg) was sealed under vacuum (10$^{-4}$ Torr) in a silica tube and heated (50° C./h) to 500 (or 400)° C. for 60 h, followed by cooling to room temperature at 50° C./h. The excess flux was removed with DMF to reveal dark brown polycrystalline material (0.4 g, about 80% yield based on Sn). Electron Dispersive Spectroscopy (EDS) analysis gave the average formula $K_{1.4}MnSn_{2.5}S_{5.5}$. A more accurate determination of Mn, K and S content by Inductively Coupled-Plasma (ICP)-Atomic Emission (AES) analysis is consistent with the formula $K_{2x}Mn_xSn_{3-x}S_6$ with x being, in most cases, between 0.7 and 0.8. A small quantity of MnS (green powder) can be picked out by hand under microscope.

B) Hydrothermal Synthesis $K_2S$ (0.40 mmol, 0.044 g), $MnCl_2$ (0.20 mmol, 0.025 g), Sn (0.40 mmol, 0.024 g) and S (0.40 mmol, 0.014 g) were combined and loaded in a ⅜ inch Pyrex tube along with 0.30 mL of water under nitrogen atmosphere in a glovebox. The tube was then evacuated to <3×10$^{-3}$ torr and flame-sealed. The tube was kept in an oven at about 220° C. for 14 d. The products were isolated in air by filtration and washed with deionized water, ethanol and ether. Under microscopic observation, the product consisted of dark red/black hexagonal plate-like crystals (FIG. 2) plus unidentified white material. The yield for manually separated crystals was about 15-30%. The formula for the product of the hydrothermal reaction determined by single crystal diffraction measurements (see below) was $K_{1.9}Mn_{0.95}Sn_{2.05}S_6$ (1a).

C) Hydrothermal Synthesis (ii)

Elemental Sn (60 mmol, 7.140 g), Mn (30 mmol, 1.656 g), S (180 mmol, 5.784 g), $K_2CO_3$ (30 mmol, 4.157 g), water (40 mL) were mixed in a 125 mL Teflon-lined stainless steel autoclave. The autoclave was sealed and placed in a box furnace with a temperature of 200° C. The autoclave remained undisturbed at this temperature for 4 days. The autoclave was then allowed to cool to room temperature. A brown polycrystalline product was isolated by filtration (14.30 g, yield≈84%), washed several times with water, acetone and diethylether, in order, and dried under vacuum. The composition of the product was determined by ICP-AES (K, Sn, Mn, S content) and TGA ($H_2O$) to be $K_{2x}Mn_xSn_{3-x}S_6 \cdot 2H_2O$ (x=0.95).

Synthesis of $H_{0.4}Mn_{0.2}Sn_{2.8}S_6$ $K_{2x}Mn_xSn_{3-x}S_6$ (x=0.5-0.95) (1) (0.93 mmol, 0.52 g) was added as a solid in 20 mL HCl (0.6 M) solution. The mixture was kept under magnetic stirring for ≈12 h. This procedure was performed twice in order to ensure complete conversion of (1) to the proton-containing material. The grey solid was then isolated by filtration, washed several times with water, acetone, and ether, and dried in air (Yield 0.408 g, 95%). EDS analysis gave the average formula $Mn_{0.3}Sn_{2.7}S_{5.6}$. Determination of the Mn and S content by ICP-AES was consistent with the formula $H_{0.2}Mn_{0.2}Sn_{2.8}S_6$ (proton content was calculated based on charge balance requirements; Sn content was calculated based on the general formula $H_{2x}Mn_xSn_{3-x}S_6$ for x=0.2).

Ion-Exchange Studies

The $Cs^+$, $Sr^{2+}$, $Hg^{2+}$, $Pb^{2+}$, $Cd^{2+}$, $Ag^+$ uptake from solutions of various concentrations were studied by the batch method at a volume to mass ratio of about 1000 mL/g, room temperature and 24 h contact.

The competitive ion exchange experiments of (1) or (2) were also carried out with the batch method at volume to mass ratios of 238-1495 mL/g, room temperature and 24 h contact. The distribution coefficient $K_d$, used for the determination of the affinity and selectivity of materials for $Cs^+$, $Sr^+$, $Hg^{2+}$, $Pb^{2+}$, $Cd^{2+}$, $Ag^+$ is given by the equation:

$$K_d = \frac{V[(C_0 - C_f)/C_f]}{m};$$

where $C_0$ and $C_f$ are the initial and equilibrium concentration of $M^{n+}$ (ppm), V is the volume (ml) of the testing solution and m is the amount of the ion exchanger (g) used in the experiment.

Physical Measurements

Powder patterns were obtained using a CPS 120 INEL X-ray powder diffractometer with Ni-filtered Cu Kα radiation operating at 40 kV and 20 mA and equipped with a position-sensitive detector. Samples were ground and spread on a glass slide.

The energy dispersive spectroscopy (EDS) analyses were performed using a JEOL JSM-6400V scanning electron microscope (SEM) equipped with a Tracor Northern energy dispersive spectroscopy (EDS) detector. Data acquisition was performed with an accelerating voltage of 25 kV and 40 s accumulation time.

Accurate determination of the content of $K^+$, $Mn^{2+}$, $Sn^{4+}$ and $S^{2-}$ of precursor compounds (1) were performed on diluted aqua regia ($HCl:HNO_3=3:1$) solutions of (1) by Inductively Coupled Plasma-Atomic Emission Spectroscopy (ICP-AES) using a VISTA MPX CCD SIMULTANEOUS ICP-OES instrument. ICP-AES was also used for determination of the concentration of $Sr^{2+}$ in water solutions after ion-exchange. Standards of the ions of interest ($K^+$, $Mn^{2+}$, $Sn^{4+}$, $S^{2-}$, $Ca^{2+}$, $Mg^{2+}$, $Sr^{2+}$) were prepared by diluting commercial (Aldrich or GFS chemicals) 1000 ppm ICP-standards of these ions. The calibration was linear or quadratic with errors of 5-10%.

$Cs^+$, $Hg^{2+}$, $Pb^{2+}$, $Cd^{2+}$, $Ag^+$ were analyzed with Inductively Coupled Plasma-Mass Spectroscopy (ICP-MS) using a computer-controlled Thermo Elemental (Waltham, Mass.) PQ ExCell Inductively Coupled Plasma Mass Spectrometer with a quadruple setup. Ten standards of the various cations in the range of 1-40 ppb were prepared by diluting commercial (Aldrich or GFS chemical) about 1000 ppm solutions of these cations. The samples were diluted to lower the concentrations below than 40 ppb. All samples (including standards) were prepared in a 3% nitric acid solution with 5 ppb of a $^{115}In$ internal standard in order to correct for instrumental drift and matrix effects during analysis.

X-ray photoelectron spectroscopy (XPS) was performed on a Perkin Elmer Phi 5400 ESCA system equipped with a Magnesium Kα x-ray source. Samples were analyzed at pressures between $10^{-9}$ and $10^{-8}$ torr with a pass energy of 29.35 eV and a take-off angle of 45°. All peaks were referred to the signature C1s peak for adventitious carbon at 284.6 eV.

Infrared spectra (IR) in the mid-IR region [4000-400 $cm^{-1}$, Diffuse Reflectance Infrared Fourier Transform (DRIFT) method] were recorded with a computer-controlled Nicolet 750 Magna-IR series II spectrometer equipped with a TGS/PE detector and silicon beam splitter in 2-$cm^{-1}$ resolution.

UV/vis/near-IR diffuse reflectance spectra were obtained at room temperature on a Shimadzu UV-3010 PC double beam, double monochromator spectrophotometer in the wavelength range of 200-2500 nm. $BaSO_4$ powder was used as a reference (100% reflectance) and base material on which the powder sample was coated. The reflectance data were converted to absorption using the Kubelka-Munk function, and the band edge for each sample was estimated from the intercept of the line extrapolated from the high-energy end of the absorption to the baseline.

Pyrolysis mass spectra were obtained with a TRIO-1 mass spectrometer. Samples were heated at 20° C./min and the volatile products were ionized by electron ionization.

Thermogravimetric analysis (TGA) was carried out with a Shimatzu TGA 50. Samples (10±0.5 mg) were placed in quartz crucible. Samples were heated from ambient temperature to 500° C. in a 20 ml/min flow of $N_2$ or air. Heating rate of 10° C./min was used and continuous records of sample temperature, sample weight and its first derivative (DTG) were taken.

A Siemens SMART Platform CCD diffractometer operating at room temperature and using graphite-monochromatized Mo Kα radiation, was used for data collection on single crystals of compound (1) and its Cs-exchanged analogue. Cell refinement and data reduction were carried out with the program SAINT. An empirical absorption correction was done to the data using SADABS. The intensities were extracted by the program XPREP. The structures were solved with direct methods using SHELXS and least square refinement were done against $F_{obs}^2$ using routines from SHELXTL software. The K and Cs atom positions were modeled as split sites.

$UO_2^{2+}$, $Th^{4+}$ and $Pu^{4+}$ Capture Using Chalcogenic Compounds of the General Formula $A_{2x}M_xSn_{3-x}S_6$ (x=0.1-0.95; A=$Li^+$, $Na^+$, $K^+$, $Rb^+$; M=$Mn^{2+}$, $Mg^{2+}$, $Zn^{2+}$, $Fe^{2+}$)

A process for the removal of $UO_2^{2+}$, $Th^{4+}$ and $Pu^{4+}$ using the layered chalcogenide materials of the general formula $A_{2x}M_xSn_{3-x}S_6$ (x=0.1-0.95; A=$Li^+$, $Na^+$, $K^+$, $Rb^+$; M=$Mn^{2+}$, $Mg^{2+}$, $Zn^{2+}$, $Fe^{2+}$) is also provided. A detailed investigation of the uranyl ($UO_2^{2+}$) exchange properties of $K_{1.95}M_{0.95}Sn_{2.05}S_6$ material (KMS-1) revealed that this ion-exchanger shows a huge absorption capacity equal to 377 g uranium per Kg of the ion-exchanger, extremely fast exchange kinetics, high removal capacity over a wide pH range and amazing selectivity for uranyl against cations such as $Na^+$, $Ca^{2+}$ and $Mg^{2+}$ which can be present in high concentrations in natural water resources and wastewater.

The extremely rapid and efficient absorption of uranium by KMS-1 may be useful for remediation processes (wherever uranium waste is generated) and for the extraction of uranium from seawater. In addition, preliminary experiments showed that KMS-1 can exchange all its $K^+$ ions by $Th^{4+}$. Therefore, it may be also used for the capture of $Pu^{4+}$ which is closed analogue of $Th^{4+}$. Compounds $A_{2x}M_xSn_{3-x}S_6$ (x=0.1-0.95; A=$Li^+$, $Na^+$, $K^+$, $Rb^+$; M=$Mn^{2+}$, $Mg^{2+}$, $Zn^{2+}$, $Fe^{2+}$) can be used for remediation processes in nuclear waste facilities and uranium mines and for extraction of uranium from seawater.

The majority of inorganic ion exchangers with uranyl exchange capacity reported are oxygen-based materials. Clays and zeolites are characteristic examples of these materials. Metal chalcogenides with layered structures and loosely bound interlayer cations could also exhibit similar properties to oxides but with unique attributes. The presence of the soft chalcogen ligands can induce to them innate selectivity for heavier metal ions and against hard ions such as $Na^{2+}$ or $Ca^{2+}$, a property which could be particularly useful for ion discriminations in nuclear wastes or wastewater with heavy metal ion contaminants. Layered chalcogenides with ion exchange properties remain scarce. These materials are mainly limited to alkali ion-intercalated transition metal dichalcogenides $A_xMQ_2$ (A=alkali ion; M=early transition metal, Q=S, Se, Te). Such materials, however, are not suitable for practical applications as ion exchangers, due to their thermodynamic and hydrolytic instability.

Compounds of the general formula $A_{2x}M_xSn_{3-x}S_6$ (x=0.1-0.95; $A=Li^+, Na^+, K^+, Rb^+$; $M=Mn^{2+}, Mg^{2+}, Zn^{2+}, Fe^{2+}$) have various advantages when compared to known uranyl sorbents. Some of these advantages are as follows:

a) They possess a very high cation-exchange capacity for uranyl equal to 377 g uranium per Kg of the ion-exchanger which exceeds the capacities of most of the known inorganic ion-exchangers (e.g. clays showed uranyl-exchange capacities ~100-120 g/Kg) and activated carbon (–0.1-0.2 g/Kg);
  b) They display huge selectivity for $UO_2^{2+}$ over ions like $Na^+, Ca^{2+}, Mg^{2+}$ being the major competitors for the cation exchange of uranyl in wastewater and natural water resources. Even the presence of sodium and calcium cations in concentrations several-thousand more than those of $UO_2^{2+}$ does not affect the uranyl absorption capacity of $A_{2x}M_xSn_{3-x}S_6$ materials. Clays and zeolites usually loose much of their uranyl absorption capacity when large excess of $Na^+, Ca^{2+}, Mg^{2+}$ are present in water;
  c) They absorb uranyl efficiently in a wide pH range (2.5-10). Oxygen-based ion exchangers usually show efficient uranyl exchange capacity only for pH>4-6;
  d) $A_{2x}M_xSn_{3-x}S_6$ materials as purely inorganic compounds may possess a number of advantages as $UO_2^{2+}$ sorbents over the conventional organic ion exchange resins, such as superior chemical, thermal and radiation stability;
  e) They can be prepared with a low cost and environmental friendly synthetic procedure. Thus, these materials exhibit distinctive advantages over functionalized silica-based sorbents, which are prepared with a high cost synthesis (due to the use of expensive organic surfactants, organic solvents and organosilane compounds) resulting also in harmful organic waste (e.g. toluene is used as a solvent for these reactions).

Compounds of the formula $A_{2x}M_xSn_{3-x}S_6$ display a layered structure. The layer is built up by edge-sharing "M, Sn" $S_6$ octahedra with M and Sn atoms occupying the same crystallographic position and all sulfur ligands being three-coordinated (FIG. 1). The $A^+$ ions intercalated between the layers are positionally disordered and are easily exchangeable for a variety of cations.

The ion exchange of $K_{1.9}Mn_{0.95}Sn_{2.05}S_6$ (KMS-1) with $UO_2^{2+}$ can be described with the following equation:

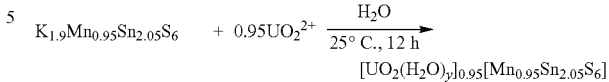

Figure 15A:
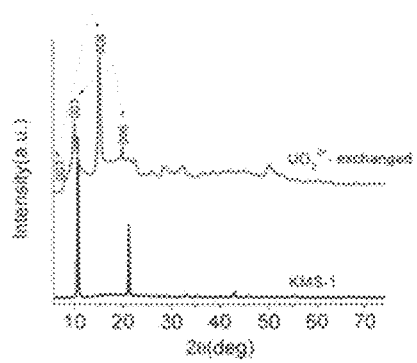
FIG. 15A shows X-ray diffraction patterns for pristine KMS-1 and its uranyl-exchanged product.
Figure 15B:
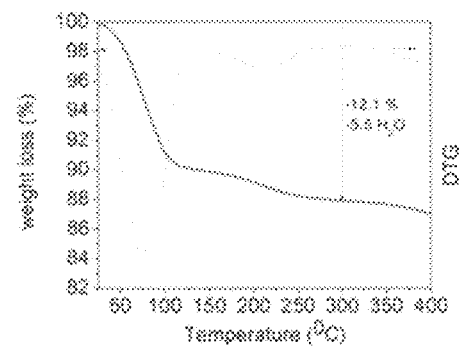
FIG. 15B shows TGA ($N_2$ atmosphere, heating rate ~10° C./min) and DTG curves for the uranyl-exchanged product.

The complete exchange of $K^+$ ions by $UO_2^{2+}$ was confirmed by Inductively-Coupled Plasma Atomic Emission Spectroscopy (ICP-AES) and Energy Dispersive Spectroscopy (EDS). These analytical data showed the expected ratio U:Mn:Sn:S~1:1:2:6 for the fully-exchanged material. Powder X-Ray Diffraction (PXRD) data (FIG. 15A) showed expansion (1.4-9.8 Å) of the c-axis of KMS-1 with the intercalation of uranyl ions. One broad (003) and two (006) peaks were apparent in the PXRD pattern of the exchanged material (FIG. 1 SB). These results indicated the intercalation of $UO_2^{2+}$ as hydrated cation and the coexistence of at least two differently hydrated phases with c-axes of 26.43(1) and 34.86(1) Å. Thermogravimetric analysis (TGA) for the uranyl-exchanged material revealed a total weight loss of ~12% from 25-300° C. (FIG. 15B) which may be assigned to the removal of ~5.5 water molecules per formula of the compound.

Figure 15C:
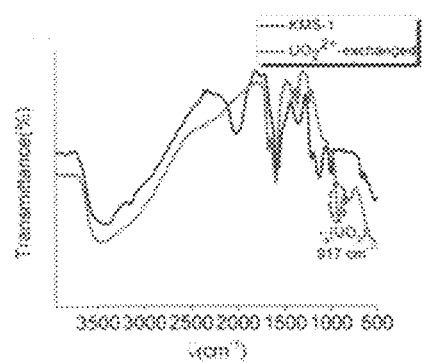
FIG. 15C is a Mid-IR spectra of KMS-1 and its uranyl-exchanged analogue wherein the peak assigned to the anti-symmetric stretching of the uranyl cation is highlighted by drawing a circle.
Figure 15D:
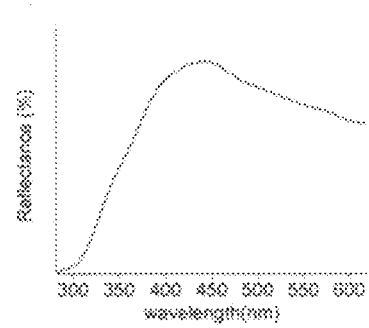
FIG. 15D is a solid-state UV-Vis diffuse reflectance spectrum of the $UO_2^{2+}$-exchanged compound.

The presence of uranyl cations in the exchanged material was demonstrated by infrared (IR), solid state UV-Vis reflectance and X-ray photoelectron spectroscopy (XPS). The IR spectrum of the exchanged material showed the existence of a strong peak at ~917 cm$^{-1}$ (not present in the spectrum of KMS-1) which is assigned to the anti-symmetric vibration of the $[O=U^{VI}=O]^{2+}$ group (FIG. 15C). It is interesting to note this peak is significantly red-shifted compared to the corresponding peak for the aqueous $UO_2^{2+}$ complexes (958-974 cm$^{-1}$). This is indicative of a significant interaction of the intercalated uranyl cation with the metal sulfide layers. The solid state UV-Vis reflectance spectrum of the $UO_2^{2+}$-exchanged material contains a broad intense peak centered at ~440 nm (FIG. 15D). This band, which is characteristic for uranyl complexes, is attributed to a charge-transfer (ligand to metal) process. XPS data revealed the presence of $U4f_{7/2}$ and $U4f_{5/2}$ peaks, with their main components corresponding to binding energies of 381.8 (peak 3, FIG. 16A) and 392.3 eV (peak 1, FIG. 16B) respectively. These binding energies are consistent with $U^{6+}$. Furthermore, the presence of satellite peaks with binding energies ~2.9-3.2 eV (peak 2, FIG. 16A; peak 3, FIG. 16B) higher than those of the main $U4f_{7/2}$ and $U4f_{5/2}$ lines is also characteristic of hexavalent uranium.

To assess the uranyl removal capacity of KMS-1, $UO_2^{2+}$ ion-exchange equilibration studies were conducted. The $UO_{2+}$ ion exchange equilibrium data are shown in FIG. 17A. These data can be fitted with the Langmuir isotherm model expressed by the equation:

$$q = q_m \frac{bC_g}{(1 + bC_g)} \qquad (1)$$

wherein q (mg/g) is the amount of the cation adsorbed at the equilibrium concentration $C_e$ (ppm), $q_m$ is the maximum adsorption capacity of the adsorbent and b (L/mg) is the Langmuir constant related to the free energy of the adsorption.

The maximum $UO_2^{2+}$ exchange capacity $q_m$ of KMS-1 was found to be 377±15 mg/g, which exceeds the capacities of most of the known inorganic exchangers (100-120 mg/g) and it is comparable with the capacities of the best organic resins (400-450 mg/g).

The affinity of the material for $UO_2^{2+}$ can be expressed in terms of the distribution coefficient $$K_d = \frac{V[(C_0 - C_f)/C_f]}{m}$$

where $C_0$ and $C_f$ are the initial and equilibrium concentration of $M^{n+}$ (ppm), V is the volume (ml) of the testing solution and m is the amount of the ion exchanger (g) used in the experiment. The $K_d$ values for $UO_2^{2+}$ exchange were found very high (i.e., in the range $10^4$-$1.8\times10^5$ mL/g) indicating an exceptional affinity of KMS-1 for $UO_2^{2+}$.

The effect of pH on the uranyl exchange was also investigated. The initial U concentration for these variable-pH experiments was ~5 ppm. Inductively-Coupled Plasma Mass Spectroscopy (ICP-MS) analyses data for the solutions after the ion-exchange showed that the uranyl absorption was quantitative (removal of 95.6-99.8%) within the wide pH range 2.5-9 (FIG. 17B). It is interesting to note that the uranyl removal efficiency of KMS-1 was retained significant (~80%) under very alkaline conditions (pH~10), where uranyl cations form stable anionic complexes with carbonate ions (carbonate ions are generated by carbon dioxide absorbed by alkaline solutions) and are not easily exchangeable by cations.

Figure 18A:
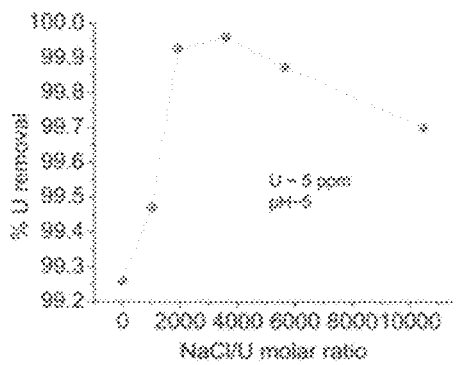
FIGS. 18A-18D are graphs showing the dependence of $UO_2^{2+}$ removal capacity of KMS-1 on the excess of (a), (b) NaCl, (c) $NaNO_3$ and (d) $CaCl_2$ wherein the V:m ratio and contact time for these experiments were 1000 mL/g and 12 h respectively.
Figure 18B:
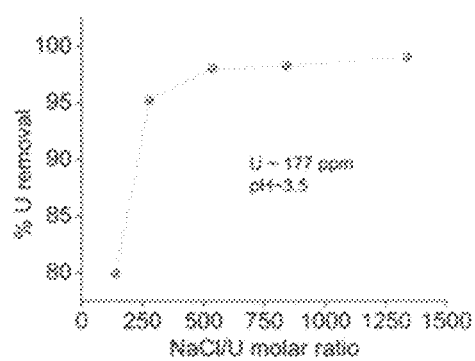
Figure 18C:
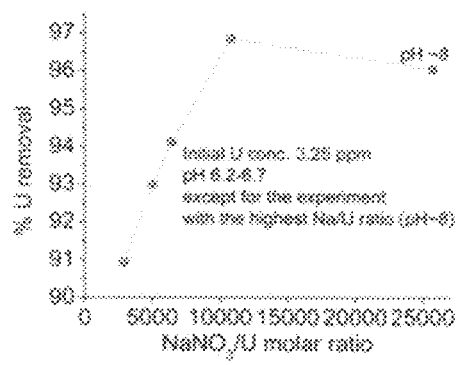

Nuclear waste and contaminated groundwater usually contain very high salt concentrations and uranium at very low levels (<1 ppm). Therefore, a detailed investigation of the selectivity of KMS-1 for uranyl in the presence of large excess of NaA, where A=Cl$^-$, $NO_3^{2}$, and $CaCl_2$ electrolytes was performed. The results of these experiments revealed that the presence of NaA even in concentrations $2.5\times10^4$ times higher than the uranyl concentration not only did not reduce the $UO_2^{2+}$ removal capacity of KMS-1 but it actually enhanced the uranyl absorption by KMS-1 (FIGS. 18A, 18B and 18C). For example, the $K_d^U$ value found in the presence of $10^4$-fold excess of NaCl (pH~5) was $3.3\times10^5$ mL/g, while the $K_d^U$ value in distilled water (no salt, pH~5) was $1.3\times10$ mL/g.

Figure 18D:
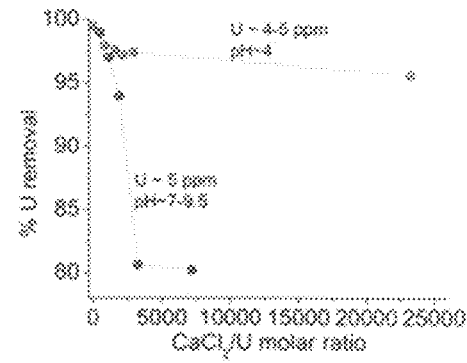

The exact reasons for this enhancement of uranyl removal are not known. The calcium ion ($Ca^{2+}$) as a divalent cation is expected to be a stronger competitor for the uranyl exchange of KMS-1. However, only a small decrease (~4.5%) of the $UO_2^{2+}$ removal capacity of KMS-1 was observed even with concentrations of $CaCl_2$ $2.5\times10^4$ times higher than that of uranium (FIG. 18D). Even under alkaline conditions (e.g., pH~9) not favoring cation-exchange of $UO_2^{2+}$ and with very large ($2.5\times10^4$ fold) excess of $CaCl_2$, KMS-1 retained a significant removal capacity (~80%) for uranyl (FIG. 18D).

Figure 19A:
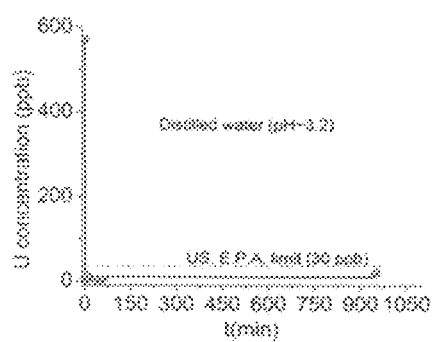
FIGS. 19A and 19B are kinetics for $UO_2^{2+}$ removal from distilled water (initial U concentration ~570 ppb, pH~3.2, V:m=1000 mL/g) (FIG. 19A) and portable water (initial U concentration ~970 ppb, pH~3.6, V:m=1000 mL/g) (FIG. 19B) wherein the portable water sample contained also large excess of $Na^+$ (10.7 ppm), $Ca^{2+}$ (32.9 ppm) and $Mg^{2+}$ (8.5 ppm).
Figure 19B:
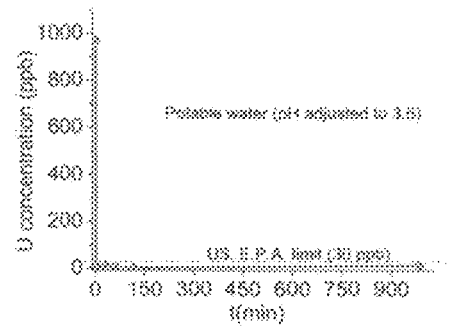

The kinetics of the uranyl ion-exchange by KMS-1 were also examined. The initial uranium concentration was ~570 ppb and the pH of the solutions was adjusted to ~3. The absorption of uranyl by KMS-1 was found to be extremely fast, reaching 99.3% removal capacity within only 2 minutes of solution/KMS-1 contact (FIG. 19A). In addition, the kinetics for the $UO_2^{2+}$ removal from portable water intentionally contaminated with ~1 ppm of uranium (the final pH was adjusted to ~3.6) were studied. The results (FIG. 19B) revealed that the absorption of uranyl remained very fast even under these conditions (i.e., in the presence of various competitive cations such as $Ca^{2+}$, $Mg^{2+}$, $Na^+$, etc. in much greater concentrations than uranium). It is important to note that the final uranium concentrations measured after these exchange experiments with distilled or portable water were in the range of 1.5-20 ppb, much lower than the acceptable limit of 30 ppb defined by United States Environmental protection Agency (EPA).

Synthesis of $K_{2x}Mn_xSn_{3-x}S_6$ (KMS-1) (x=0.1-0.95)

A) Solid State Synthesis

A mixture of Sn (1.9 mmol, 226 mg), Mn (1.1 mmol, 60 mg), $K_2S$ (2 mmol, 220 mg), and S (16 mmol, 512 mg) was sealed under vacuum ($10^{-4}$ Torr) in a silica tube and heated (50° C./h) to 500 (or 400)° C. for 60 h, followed by cooling to room temperature at 50° C./h. The excess flux was removed with DMF to reveal dark brown polycrystalline material (0.4 gr, ~80% yield based on Sn). Electron Dispersive Spectroscopy (EDS) analysis gave the average formula "$K_{0.4}MnSn_{2.5}S_{5.5}$". More accurate determination of Mn, K and S content by Inductively Coupled-Plasma (ICP)-Atomic Emission (AES) analysis is consistent with the formula $K_{2x}Mn_xSn_{3-x}S_6$ with x being, in most cases, in between 0.7 and 0.8. Small quantity of MnS (green powder) can be picked out by hand under microscope.

B) Hydrothermal Synthesis (ii)

Elemental Sn (60 mmol, 7.140 g), Mn (30 mmol, 1.656 g), S (180 mmol, 5.784 g), $K_2CO_3$ (30 mmol, 4.157 g), water (40 mL) were mixed in a 125 mL Teflon-lined stainless steel autoclave. The autoclave was sealed and placed in a box furnace with a temperature of 200° C. The autoclave remained undisturbed at this temperature for 4 days. The autoclave was then allowed to cool at room temperature. A brown polycrystalline product was isolated by filtration (14.30 g, yield≈84%), washed several times with water, acetone and diethylether (with this order) and dried under vacuum. The exact composition of the product determined by ICP-AES (K, Sn, Mn, S content) and TGA ($H_2O$) was $K_{2x}Mn_xSn_{3-x}S_6 \cdot 2H_2O$ (x=0.95).

Ion-Exchange Studies

A typical ion-exchange experiment of KMS-1 with $UO_2^{2+}$ can be described as follows: In a solution of $UO_2(NO_3)_2 \cdot 6H_2O$ (0.03 mmol, 15 mg) in water (10 ml), compound KMS-1 (0.025 mmol, 15 mg) was added as a solid. The mixture was kept under magnetic stirring for 12 h. Then, the polycrystalline material was isolated by filtration, washed several times with water, acetone and ether and dried in the air.

The $UO_2^{2+}$ uptake from solutions of various concentrations was studied by the batch method at V:m~1000 mL/g, pH~3-4, room temperature and 12 h contact. These data were used for the determination of $UO_2^{2+}$ adsorption isotherm.

The competitive, variable-pH and kinetic ion exchange experiments of KMS-1 were also carried out with the batch method at V:m ratio 1000 mL/g and room temperature.

Physical Measurements

Powder patterns were obtained using a CPS 120 INEL X-ray powder diffractometer with Ni-filtered Cu Kα radiation operating at 40 kV and 20 mA and equipped with a position-sensitive detector. Samples were ground and spread on a glass slide.

The energy dispersive spectroscopy (EDS) analyses were performed using a JEOL JSM-6400V scanning electron microscope (SEM) equipped with a Tracor Northern energy dispersive spectroscopy (EDS) detector. Data acquisition was performed with an accelerating voltage of 25 kV and 40 s accumulation time.

Accurate determination of the composition of KMS-1 and uranyl-exchanged compounds were performed on diluted aqua regia (HCl:$HNO_3$=3:1) solutions of the compounds by Inductively Coupled Plasma-Atomic Emission Spectroscopy (ICP-AES) using a VISTA MPX CCD SIMULTANEOUS ICP-OES instrument. The uranium content of the solution after ion-exchange was analyzed with Inductively Coupled Plasma-Mass Spectroscopy (ICP-MS) using a computer-controlled Thermo Elemental (Waltham, Mass.) PQ ExCell Inductively Coupled Plasma Mass Spectrometer with a quadruple setup. Ten standards of uranium in the range of 0.1-8 ppb were prepared by diluting commercial (GFS chemical) ~1000 ppm solution of uranium. The $^{238}$U isotope was analyzed. The samples were diluted to lower the concentrations below than 8 ppb. All samples (including standards) were prepared in a 3% (ultra-pure) nitric acid (Aldrich) solution with 2 ppb $^{153}$Eu internal standard in order to correct for instrumental drift and matrix effects during analysis.

X-ray photoelectron spectroscopy (XPS) was performed on a Perkin Elmer Phi 5400 ESCA system equipped with a Magnesium Kα x-ray source. Samples were analyzed at pressures of between $10^{-9}$ and $10^{-8}$ torr with a pass energy of 29.35 eV and a take-off angle of 45°. All peaks were referred to the signature C1s peak for adventitious carbon at 284.6 eV.

Infrared spectra (IR) in the mid-IR region [4000-400 cm$^{-1}$, Diffuse Reflectance Infrared Fourier Transform (DRIFT) method] were recorded with a computer-controlled Nicolet 750 Magna-IR series II spectrometer equipped with a TGS/PE detector and silicon beam splitter in 2-cm$^{-1}$ resolution.

Thermogravimetric analysis (TGA) was carried out with a Shimatzu TGA 50. Samples (10±0.5 mg) were placed in quartz crucible. Samples were heated from ambient temperature to 500° C. in a 20 ml/min flow of $N_2$ or air. A heating rate of 10° C./min was used and continuous records of sample temperature, sample weight and its first derivative (DTG) were taken.

Extraction of $UO_2^{2+}$ from $UO_2^{2+}$ Loaded KMS-1

About 30 mg of $UO_2^{2+}$-loaded KMS-1 was treated for 12 h with 10 mL water solution (pH~10) containing 2 M $Na_2CO_3$. The color of the solid became lighter upon its treatment with the $Na_2CO_3$ solution. The solid was isolated by filtration and then dissolved in aqua regia. ICP-AES analysis on the aqua regia solution indicated that 98% of the original U content of the solid was stripped out.

The removal of $UO_2^{2+}$ from $UO_2^{2+}$-loaded KMS-1 by using $Na_2CO_3$ is described by the following equation:

$$(UO_2)_{0.7}Mn_{0.95}Sn_{2.05}S_6 + Na_2CO_3(2M) \rightarrow Na_{1.4}Mn_{0.95}Sn_{2.05}S_6 + Na_4[UO_2(CO_3)_4]$$

$UO_2^{2+}$ ions react with carbonate ions and sodium ions replace the $UO_2^{2+}$ in the structure of KMS-1.

Regenerated KMS-1 samples showed an $UO_2^{2+}$ absorption capacity of 100-200 mg U/g.

Extraction of Uranium from Actual Water Samples

Traces of U (20-40 ppb) were added to actual water samples (portable water, lake water, seawater and contaminated groundwater containing relatively high organic water). The ability of KMS-1 to absorb U from these samples was evaluated. In addition, experiments were done with seawater samples to which no additional uranium was added.

A total of 50 mg of compound KMS-1 was weighted into a 20 ml glass vial. A 5 mL sample of the water sample was added to the vial and the mixture was kept under magnetic stirring for ~12 h. The suspension from the reaction was filtered (through filter paper, Whatman No. 1) and the filtrate was analyzed for the uranium content with Inductively Coupled Plasma-Atomic Emission Spectroscopy (ICP-AES). Each experiment was performed in triplicate. The results of these experiments are shown in Table 7.

TABLE 7

Results for the ion-exchange of KMS-1 with actual water samples intentionally contaminated with traces of uranium

| Sample | pH | V:m (mL/g) | Initial U Conc. (ppb) | Final U Conc. (ppb)* | % Removal |
|---|---|---|---|---|---|
| Potable Water | 7 | 100 | 36 | 0.5-0.7 | 98.1-98.6 |
| Lake Michigan Water | 7.3 | 100 | 34.2 | 0.9-1.1 | 96.4-97.9 |
| Groundwater with high organic (10-20 ppm) matter | 12 | 100 | 22.4 | 2.6-3 | 86.6-88.3 |
| Contaminated Seawater (Gulf of Mexico) | 8.2 | 100 | 39 | 5.3-8.5 | 78.3-86.5 |
| Original Seawater (Gulf of Mexico) | 8.2 | 100 | 3.8 | 0.6-0.9 | 76.3-84.2 |

*Range of concentrations obtained from three different experiments

It is clear from Table 7 that KMS-1 showed an excellent ability to absorb low-level uranium from portable and lake water samples. In addition, KMS-1 efficiently absorbed uranium from samples with extremely high salt concentrations (seawater) or high organic matter (groundwater). Remarkably, KMS-1 captured 76-84% of the very low uranium content of original seawater samples. This finding makes KMS-1 very promising for uranium mining from seawater.

Ion-Exchange of KMS-1 with Solutions Containing $M^{2+}$ Ions where M is Zn, Fe, Co The ion exchange of Fe, Co and Zn is of interest since the isotopes $^{59}$Fe, $^{57}$Co, $^{65}$Zn are common radionuclides resulting from corrosion processes in radionuclide-bearing waste effluents (Dyer et al., Chem. Mater. 2000, 12, 3798).

A total of 10 mg of compound KMS-1 was weighed into a 20 ml glass vial. A 10 mL sample of a water solution containing the $M^{2+}$ ions (M=Zn, Fe, Co) was added to the vial and the mixture was kept under magnetic stirring for ~12 h. The suspension from the reaction was filtered (through filter paper, Whatman No. 1) and the filtrate was analyzed for the M+content with Inductively Coupled Plasma-Atomic Emission Spectroscopy (ICP-AES). Each experiment was performed in triplicate.

The results of the ion-exchange of KMS-1 with solutions containing $M^{2+}$ ions (M=Zn, Fe, Co) are shown in Table 8. KMS-1 was able to remove quantitatively (% removal≧95) these ions (initial concentration ~800-1500 ppb) from water solutions even under acidic conditions (pH~3). The distribution coefficients were also found to be very high (in the range $10^4$-$10^5$ mL/g) for all ions. It is also very important that KMS-1 was very effective for absorption of these ions even in trace concentrations of them and with the simultaneous presence of high concentrations of various electrolytes. Specifically, experiments were performed with portable water to which ~40-70 ppb of Zn, Fe and Co were added. KMS-1 was able to remove >86% of Zn, >98% of Co and >99% of Fe from the solution. Note also that various cations competitive for ion exchange were present in large excess (e.g. $Ca^{2+}$ was present in ~500-fold excess in relation to $Fe^{2+}$). Still, KMS-1 was very effective for the removal of the $M^{2+}$ ions.

TABLE 8

Results for the ion-exchange of KMS-1 with solutions of $Zn^{2+}$, $Fe^{2+}$ and $Co^{2+}$

| Metal | pH | V:m (mL/g) | Initial Conc. (ppb) | Final Conc. (ppb)* | % Removal | $K_d$(mL/g) |
|---|---|---|---|---|---|---|
| Zn | 3 | 1000 | 1490 | 18-80 | 94.6-98.7 | $1.8\text{-}8.0 \times 10^4$ |
| Fe | 3 | 1000 | 809 | 2-4 | 99.5-99.7 | $2.1\text{-}3.5 \times 10^5$ |
| Co | 3 | 1000 | 1250 | 3-6 | 99.5-99.7 | $2.0\text{-}3.9 \times 10^5$ |
| Zn** | 7 | 1000 | 41 | 0.3-6 | 86.3-99.3 | $6.3 \times 10^3\text{-}1.4 \times 10^5$ |
| Fe** | 7 | 1000 | 73 | ≦0.8 | ≧99.0 | $≧9.5 \times 10^4$ |
| Co** | 7 | 1000 | 59 | ≦1.4 | ≧97.6 | $≧4.1 \times 10^4$ |

*range of concentrations obtained from three experiments
**results from reactions with potable water containing a mixture of $M^{2+}$ ions [the solution also contained Na (8 ppm), Ca(26 ppm), Mg(8 ppm), K(1.7 ppm)]

Adsorption of $Cd^+$, $Hg^+$ and $Pb^{2+}$ by $K_{2x}Mg_xSn_{3-x}S_6$ (x=0.5-0.95) (KMS-2)

10 mg of KMS-2 was added to a 10 mL solution containing $Cd^{2+}$ or mixture of $Hg^{2+}$, $Pb^{2+}$ and $Cd^{2+}$ (Table). The mixture was kept under magnetic stirring for ~12 h. The suspension was filtered (through filter paper, Whatman No. 1) and the filtrate was analyzed for their heavy metal content with Inductively Coupled Plasma-Mass Spectroscopy (ICP-MS).

The results shown in the Table below indicated that KMS-2 was extremely effective at absorbing $Cd^{2+}$ even under extremely acidic solution (pH~0). The experiments with the mixture of three different heavy metal ions ($Hg^{2+}$, $Pb^{2+}$ and $Cd^{2+}$) revealed that KMS-2 could lower the concentration of these ions well-below the acceptable limits for drinking water. KMS-2 contains Mg which is non-toxic. KMS-2 may therefore be suitable for the purification of drinking water.

TABLE 9

Results from $Hg^{2+}$, $Pb^{2+}$ and $Cd^{2+}$-exchange experiments with KMS-2 (V:m = 1000 mL/g, contact time ~12 h)

| Initial $M^{2+}$ (ppb) | Final $M^{2+}$ (ppb) | % Hg removal/$K_d^{Hg}$ (mL/g) | % Pb removal/$K_d^{Pb}$ (mL/g) | % Cd removal/$K_d^{Cd}$ (mL/g) |
|---|---|---|---|---|
| 10728(Cd) (pH~0, HCl 0.6 M) | 8.9 | — | — | $99.92/1.25 \times 10^6$ |
| 400(Hg) 1020(Pb) 1190(Cd) (pH~2.6) | 0.6(Hg) 4.3(Pb) 1.7(Cd) | $99.84/6.3 \times 10^5$ | $99.58/2.3 \times 10^5$ | $99.86/7.1 \times 10^5$ |
| 790(Hg) 450(Pb) 750(Cd) (pH~4.6) | 0.9(Hg) 2.7(Pb) 1.2(Cd) | $99.88/9.0 \times 10^5$ | $99.40/1.8 \times 10^5$ | $99.84/6.7 \times 10^5$ |

While the foregoing specification teaches the principles of the present invention, with examples provided for the purpose of illustration, it will be appreciated by one skilled in the art from reading this disclosure that various changes in form and detail can be made without departing from the true scope of the invention.

What is claimed is:

1. A compound of the general formula $A_{2x}M_xSn_{3-x}S_6$, wherein;
   x is 0.1-0.95;
   A is selected from the group consisting of $Li^+$, $Na^+$, $K^+$, and $Rb^+$; and
   M is selected from the group consisting of $Mn^{2+}$, $Mg^{2+}$, $Zn^{2+}$, $Fe^{2+}$, $Co^{2+}$ and $Ni^{2+}$.

2. The compound of claim 1, wherein the compound has a layered structure comprising layers of the compound separated by interlayer spaces, and further wherein the $A^+$ cations are within the interlayer spaces.

3. The compound of claim 1, wherein the compound is capable of intercalation of $Cs^+$, $Sr^{2+}$, $Hg^{2+}$, $Pb^{2+}$, $Cd^{2+}$, and/or $Ag^+$ ions.

4. The compound of claim 1, wherein A is $K^+$.

5. The compound of claim 4, wherein M is $Mn^{2+}$ or $Mg^{2+}$.

6. A process comprising: contacting a compound of the general formula $A_{2x}M_xSn_{3-x}S_6$, wherein x is 0.1-0.95, A is selected from the group consisting of $Li^+$, $Na^+$, $K^+$, and $Rb^+$; and M is selected from the group consisting of $Mn^{2+}$, $Mg^{2+}$, $Zn^{2+}$, $Fe^{2+}$, $Cd^{2+}$ and $Ni^{2+}$; with a solution comprising one or more ions selected from the group consisting of $Cs^+$, $Sr^{2+}$, $Hg^{2+}$, $Pb^{2+}$, $Cd^{2+}$, $Ag^+$ and combinations thereof.

7. The process of claim 6, wherein $Cs^+$, $Sr^{2+}$, $Hg^{2+}$, $Pb^{2+}$, $Cd^{2+}$ or $Ag^+$ ions are removed from the solution by the compound.

8. A process comprising: contacting a compound of the general formula $A_{2x}M_xSn_{3-x}S_6$, wherein x is 0.1-0.95, A is selected from the group consisting of $Li^+$, $Na^+$, $K^+$, and $Rb^+$; and M is selected from the group consisting of $Mn^{2+}$, $Mg^{2+}$, $Zn^{2+}$, $Fe^{2+}$, $Co^{2+}$ and $Ni^{2+}$; with a solution comprising one or more ions selected from the group consisting of $Fe^{2+}$, $Co^{2+}$, $Mn^{2+}$, $Zn^{2+}$, $Ni^{2+}$ and combinations thereof.

9. The process of claim 8, wherein $Fe^{2+}$, $Co^{2+}$, $Mn^{2+}$, $Zn^{2+}$ or $Ni^{2+}$ ions are removed from the solution by the compound.

10. A process comprising: contacting a compound of the general formula $A_{2x}M_xSn_{3-x}S_6$, wherein x is 0.1-0.95, A is selected from the group consisting of $Li^+$, $Na^+$, $K^+$, and $Rb^+$; and M is selected from the group consisting of $Mn^{2+}$, $Mg^{2+}$, $Zn^{2+}$, $Fe^{2+}$, $Cd^{2+}$ and $Ni^{2+}$; with a solution comprising one or more ions selected from the group consisting of $UO_2^{2+}$, $Th^{4+}$, $Pu^{4+}$ and combinations thereof.

11. The process of claim 10, wherein the solution is an aqueous solution.

12. The process of claim 11, wherein the solution further comprises $Na^+$ and $Cl^-$ ions.

13. A process comprising contacting the compound of claim 4 with a solution comprising one or more ions selected from the group consisting of $UO_2^{2+}$, $Th^{4+}$, $Pu^{4+}$ and combinations thereof.

14. The process of claim 13, wherein the solution is an aqueous solution.

15. The process of claim 14, wherein the solution further comprises $Na^+$ and $Cl^-$ ions.

16. The compound of claim 4, wherein x=0.5-0.95.

17. A process comprising: contacting a compound of the general formula $A_{2x}M_xSn_{3-x}S_6$, wherein x is 0.1-0.95, A is selected from the group consisting of $Li^+$, $Na^+$, $K^+$, and $Rb^+$; and M is selected from the group consisting of $Mn^{2+}$, $Mg^{2+}$, $Zn^{2+}$, $Fe^{2+}$, $Cd^{2+}$ and $Ni^{2+}$; with a solution comprising one or more ions selected from the group consisting of gold ions, platinum ions, palladium ions and combinations thereof.

18. The compound of claim 1, wherein the compound is characterized by a hexagonal crystal structure.

19. The compound of claim 1, wherein the compound has a layered structure comprising layers of the compound separated by interlayer spaces, wherein the $A^+$ cations are within the interlayer spaces, and further wherein the compound is capable of intercalation of $Cs^+$, $Sr^{2+}$, $Hg^{2+}$, $Pb^{2+}$, $Cd^{2+}$, and/or $Ag^+$ ions, and further wherein the compound is characterized by a hexagonal crystal structure.

* * * * *

UNITED STATES PATENT AND TRADEMARK OFFICE
CERTIFICATE OF CORRECTION

| | | |
|---|---|---|
| PATENT NO. | : 8,070,959 B2 | Page 1 of 1 |
| APPLICATION NO. | : 12/285493 | |
| DATED | : December 6, 2011 | |
| INVENTOR(S) | : Mercouri G. Kanatzidis | |

It is certified that error appears in the above-identified patent and that said Letters Patent is hereby corrected as shown below:

ON THE TITLE PAGE; item (60)

Under Related U.S. Application Data, delete "Provisional application No. 60/978,890, filed on Oct. 7, 2007" and replace with -- Provisional application No. 60/978,890, filed on Oct. 10, 2007 --

IN THE CLAIMS

Col. 24, line 26 (claim 6)

Delete "$Zn^{2+}$, $Fe^{2+}$, $Cd^{2+}$ and $Ni^{2+}$" and replace with -- $Zn^{2+}$, $Fe^{2+}$, $Co^{2+}$ and $Ni^{2+}$ --

Col. 24, line 45 (claim 10)

Delete "$Zn^{2+}$, $Fe^{2+}$, $Cd^{2+}$ and $Ni^{2+}$" and replace with -- $Zn^{2+}$, $Fe^{2+}$, $Co^{2+}$ and $Ni^{2+}$ --

Col. 24, line 65 (claim 17)

Delete "$Zn^{2+}$, $Fe^{2+}$, $Cd^{2+}$ and $Ni^{2+}$" and replace with -- $Zn^{2+}$, $Fe^{2+}$, $Co^{2+}$ and $Ni^{2+}$ --

Signed and Sealed this
Fifth Day of June, 2012

David J. Kappos
*Director of the United States Patent and Trademark Office*